(12) United States Patent
Caballero et al.

(10) Patent No.: US 7,792,729 B2
(45) Date of Patent: Sep. 7, 2010

(54) COMPUTER SUPPORT FOR MULTI-JURISDICTIONAL INVESTMENT

(75) Inventors: Crispina O. Caballero, Stouffville (CA); Thomas F. Conroy, Englewood, CO (US); Steven A. Eisenberg, Atlanta, GA (US); Brian G. Holland, Needham, MA (US); Stephen F. Kraysler, Hull, MA (US); Richard W. Mann, Greensboro, NC (US)

(73) Assignee: Mann, Conroy, Eisenberg & Associates, Greensboro, NC (US)

( * ) Notice: Subject to any disclaimer, the term of this patent is extended or adjusted under 35 U.S.C. 154(b) by 1603 days.

(21) Appl. No.: 10/839,068

(22) Filed: May 5, 2004

(65) Prior Publication Data

US 2005/0010511 A1 Jan. 13, 2005

Related U.S. Application Data

(60) Provisional application No. 60/468,284, filed on May 5, 2003.

(51) Int. Cl.
*G06Q 40/00* (2006.01)
(52) U.S. Cl. .................. 705/36 R; 705/35; 705/37; 705/30; 705/31
(58) Field of Classification Search ............. 705/35, 705/36, 37, 30, 31
See application file for complete search history.

(56) References Cited

U.S. PATENT DOCUMENTS

| | | | |
|---|---|---|---|
| 5,946,667 A | 8/1999 | Tull, Jr. et al. | 705/36 |
| 6,272,482 B1 | 8/2001 | McKee et al. | 706/47 |
| 6,411,939 B1 | 6/2002 | Parsons | 705/35 |
| 6,604,080 B1 | 8/2003 | Kern | 705/4 |

OTHER PUBLICATIONS

PCT International Search Report for PCT/US04/14082, filed May 4, 2004. pp. 1-3.
PCT Written Opinion of the International Searching Authority for PCT/US04/14082, filed May 4, 2004. pp. 1-3.
Communication Pursuant to Article 94(3) EPC for EPO Application No. 04751464.1-1238 dated Feb. 19, 2008.
Office Action Letter dated Aug. 1, 2007, from the Canadian Patent Office for Application No. 2,524,463.
Office Action dated Jun. 4, 2009, from the Canadian Intellectual Property Office for Canadian Application No. 2,524,463. pp. 1-4.
Office Action dated Aug. 25, 2009, from the Japanese Patent Office for Japanese Application No. 514301/2006. pp. 1-8.
Office Action dated Sep. 4, 2008, from the Goverment of India Patent Office for Indian Application No. 4987/DELNP/2005. pp. 1-2.

(Continued)

*Primary Examiner*—Daniel S Felten
(74) *Attorney, Agent, or Firm*—Peter K. Trzyna, Esq.

(57) ABSTRACT

Machine and related manufacturer controlling multi-jurisdictional investment; a computer system arranged to receive information and locate said information into a memory, the information including investment specifications and pricing data for the financial product, the computer system further including: an input device for receiving the information and converting the information into signals; a program control to compute, from said signals, for calculating respective valuations of parts of investment in respective jurisdictions and a program control to trigger printing documentation, including said valuations, to carry out the implementation of the parts in the respective jurisdictions. In variations thereof, such as optimizing, separating, valuation, and execution are supported.

86 Claims, 27 Drawing Sheets

OTHER PUBLICATIONS

Office Action dated Feb. 19, 2008, from the European Patent Office for European Application No. 4751464.1. pp. 1-6.
Response and claims to European Office Action filed on Dec. 18, 2008, for European Application No. 04751464.1. pp. 1-14.
Office Action for U.S. Appl. No. 10/555,801, mailed on Oct. 7, 2009. pp. 1-11.
"PlanPlus Products," PlanPlus, Inc., http://www.planplus.com/products/index.jsp Retrieved Nov. 1, 2004, 2 pages.
U.S. Appl. No. 10/319,182, filed Oct. 16, 2003, Arora et al.
Response for the Japanese Patent Application No. 514301/2006, filed on Feb. 25, 2010. pp. 1-51.
Response for the Canadian Patent Application No. 2,524,463, filed on Dec. 2, 2009. pp. 1-16.
Divisional Application divided out from Indian Patent Application No. 4987/DELNP/2005, dated Oct. 31, 2005, titled "Customer Support for Multi-jurisdictional Investment". Filed on Nov. 12, 2009. pp. 1-93.
Office Action for Canadian Patent Application No. 2,524,463, mailed on Jan. 5, 2010. pp. 1-4.

Illustrates a flowchart for an embodiment.

Figure 13:
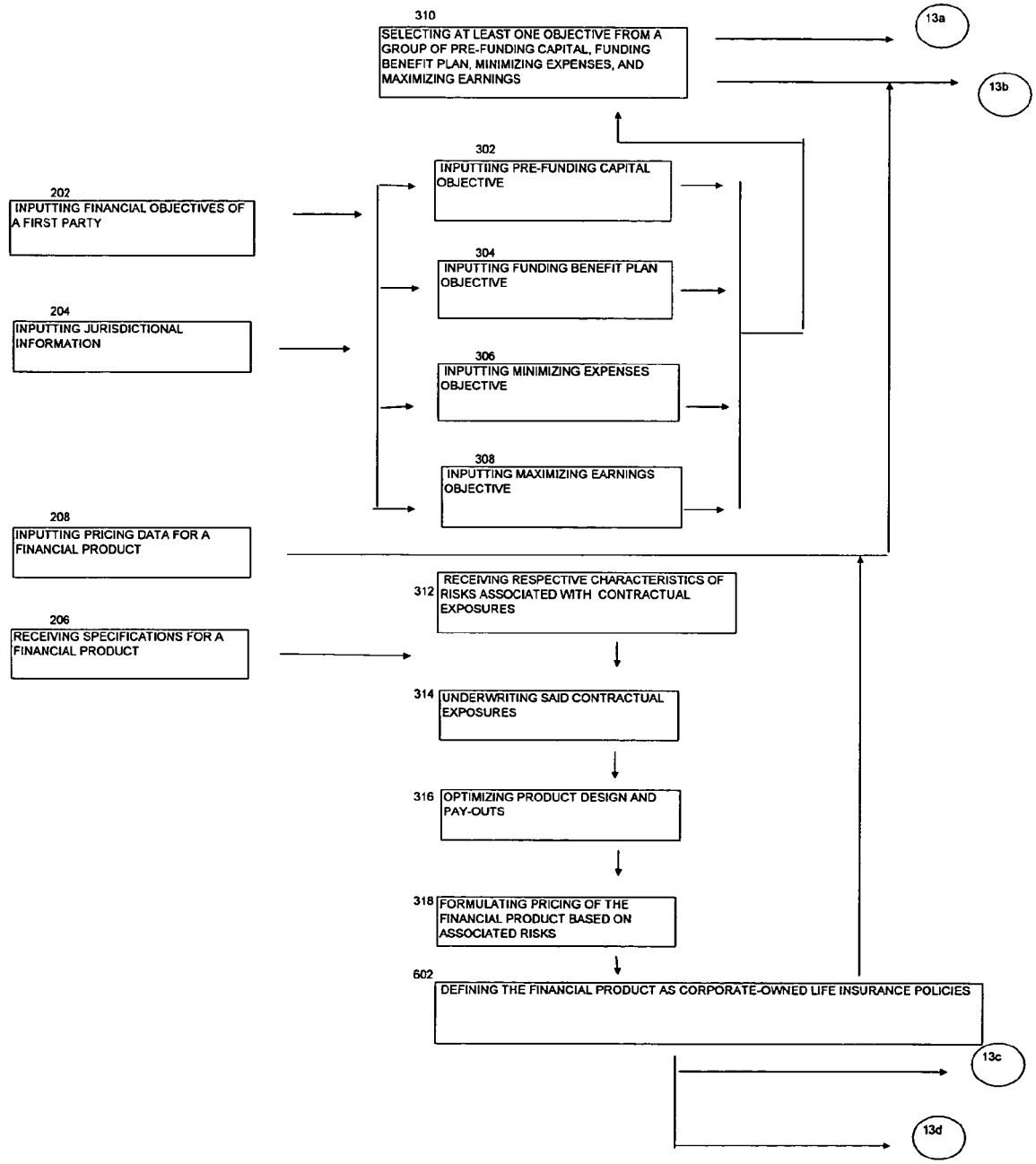

Illustrates a continuation of the flowchart of Figure 13.

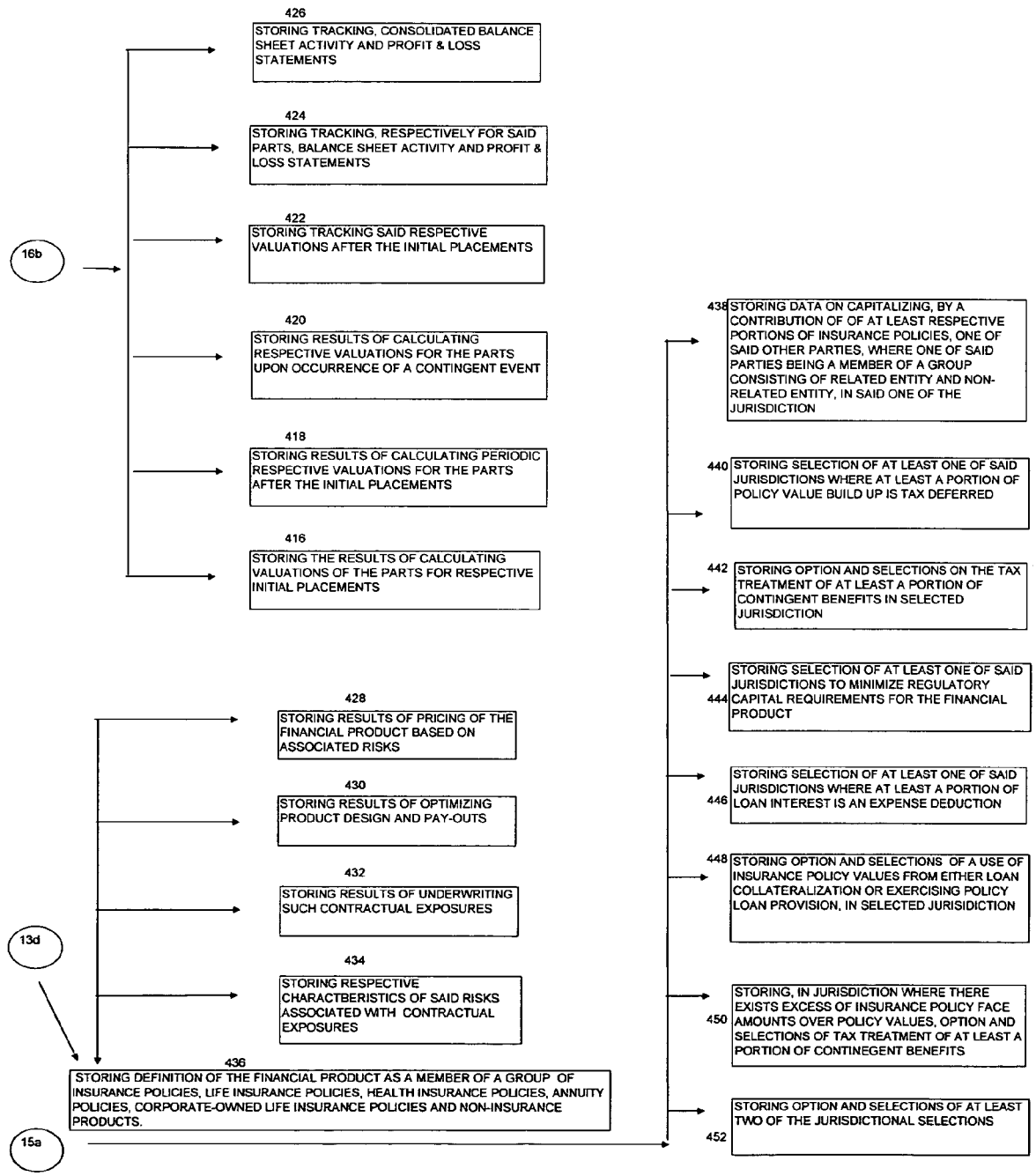

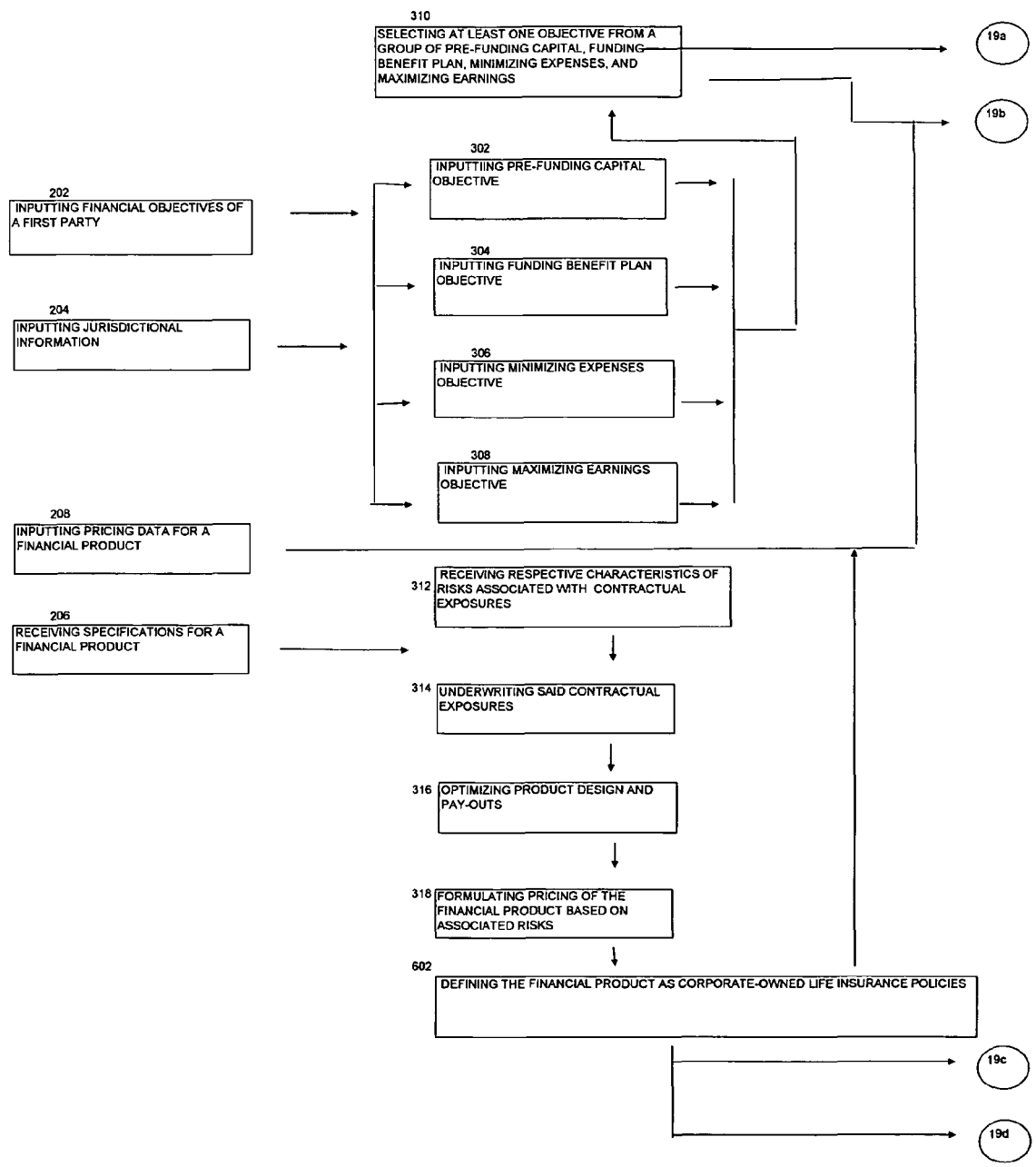

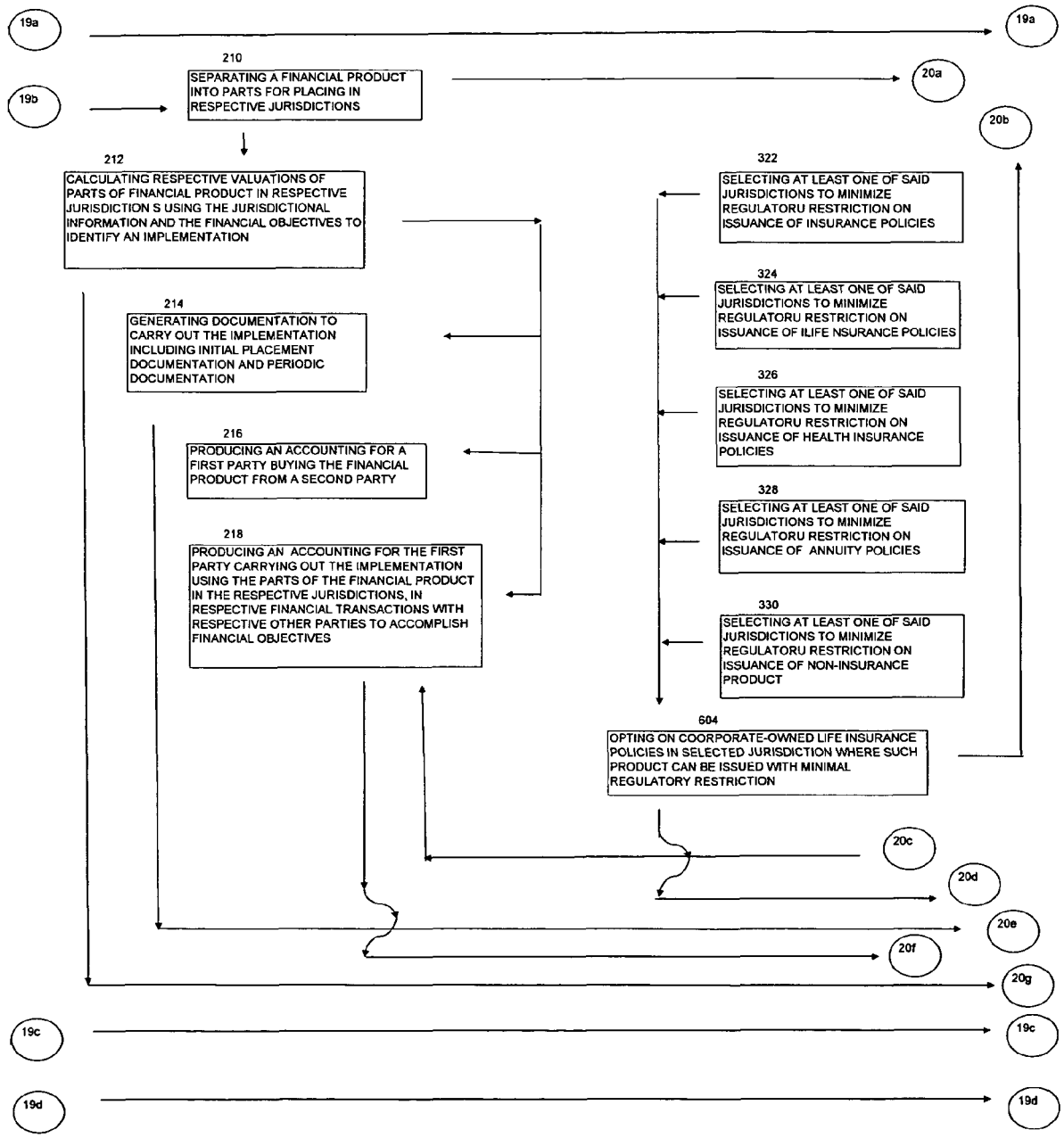

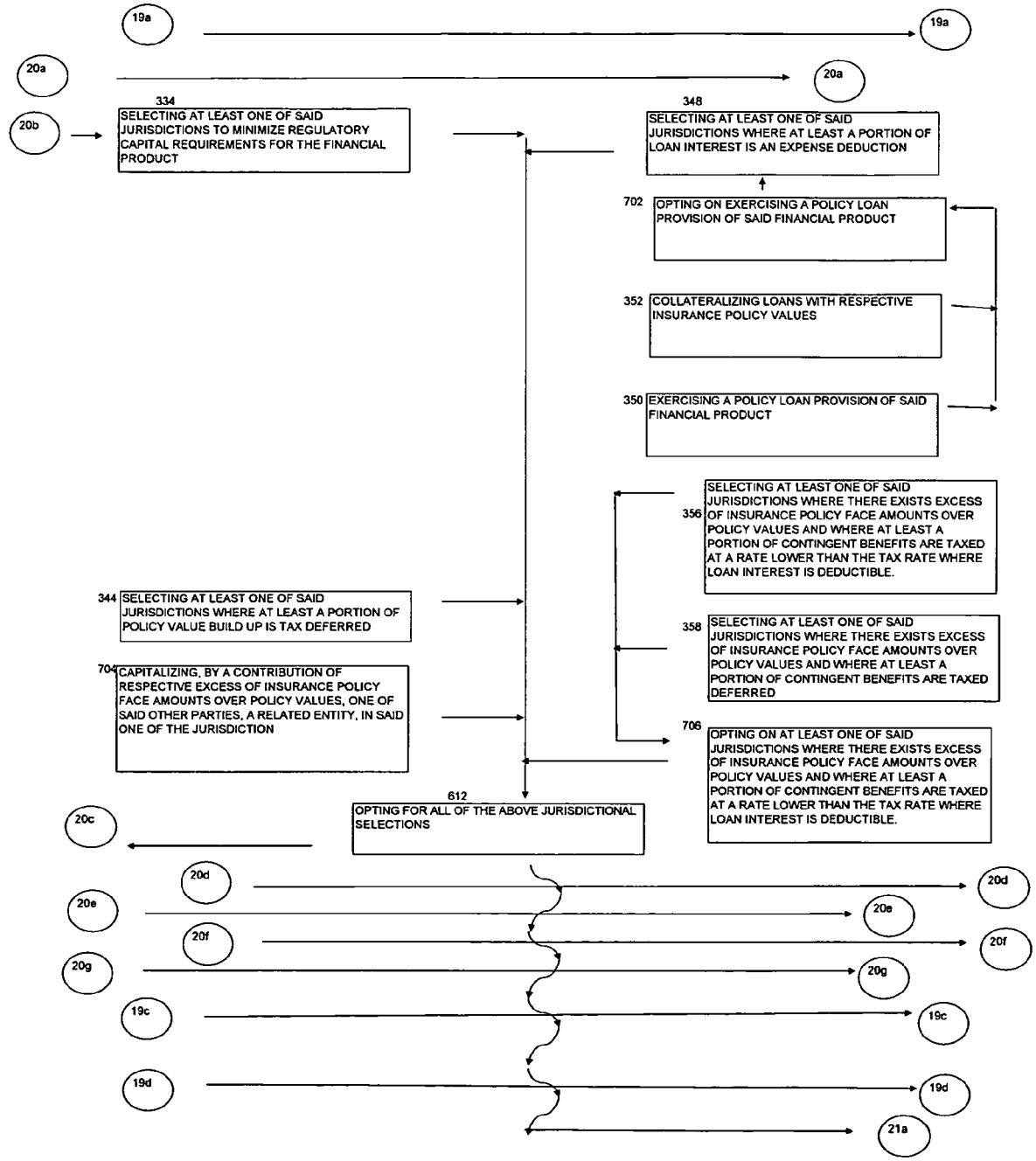

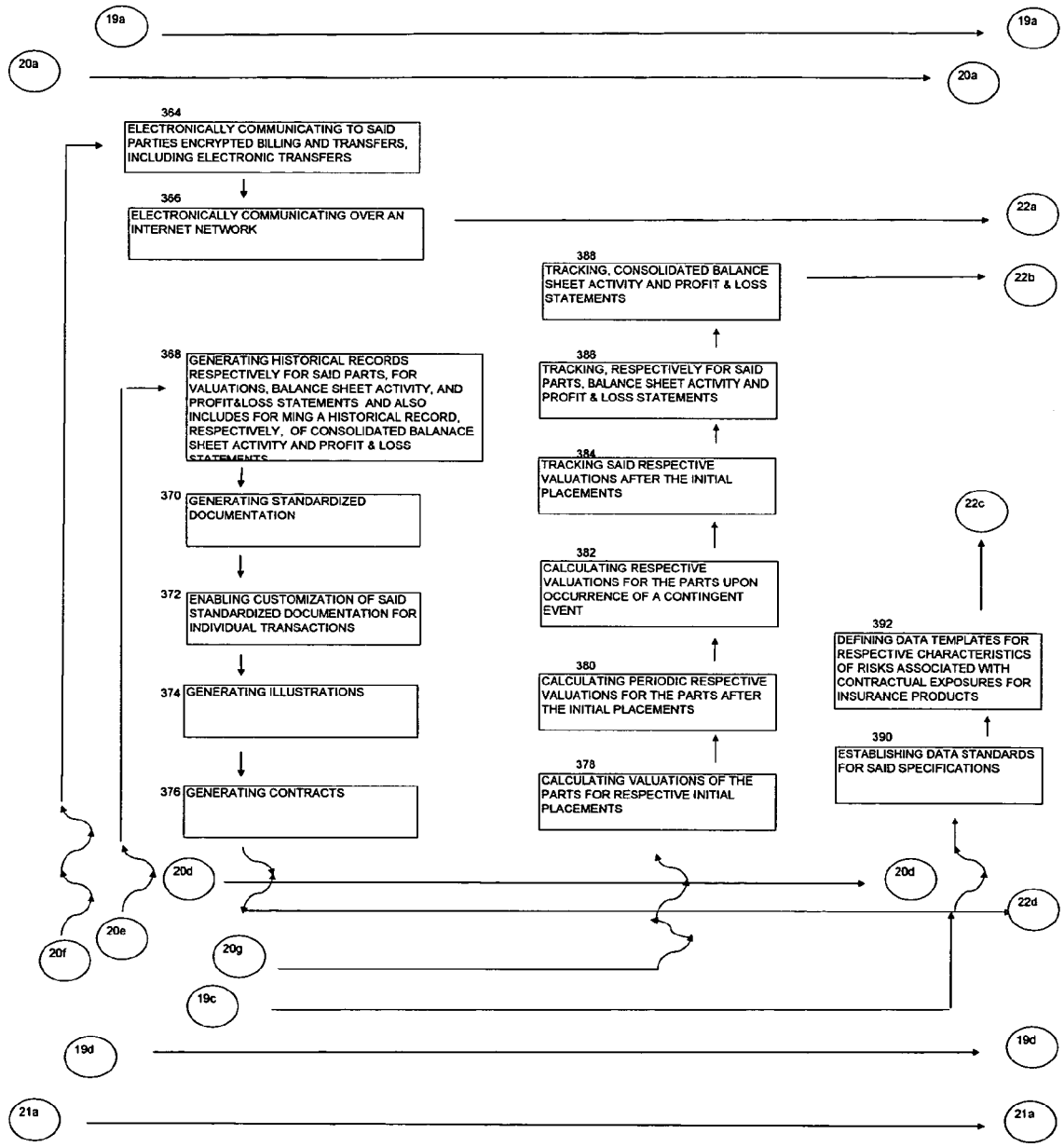

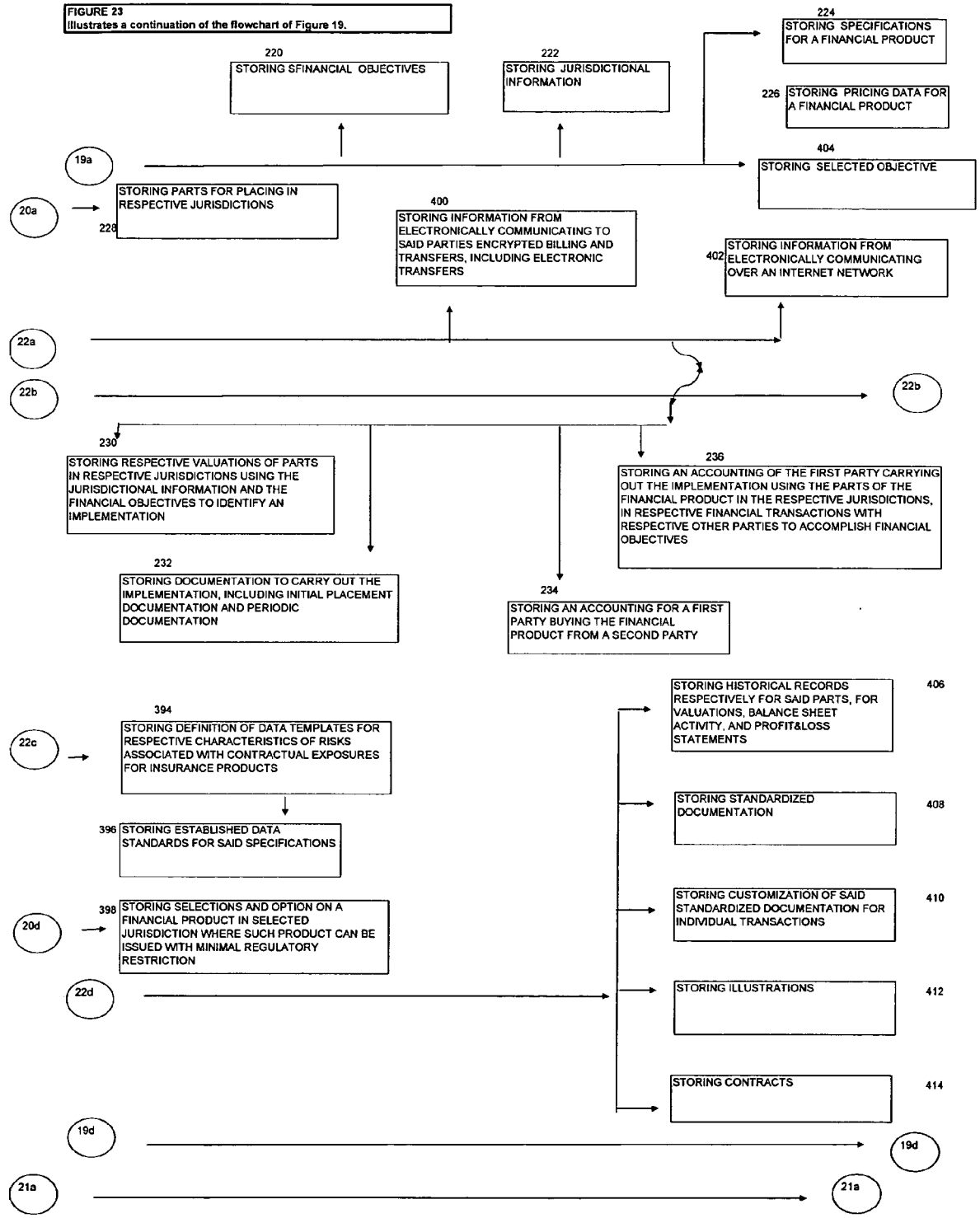

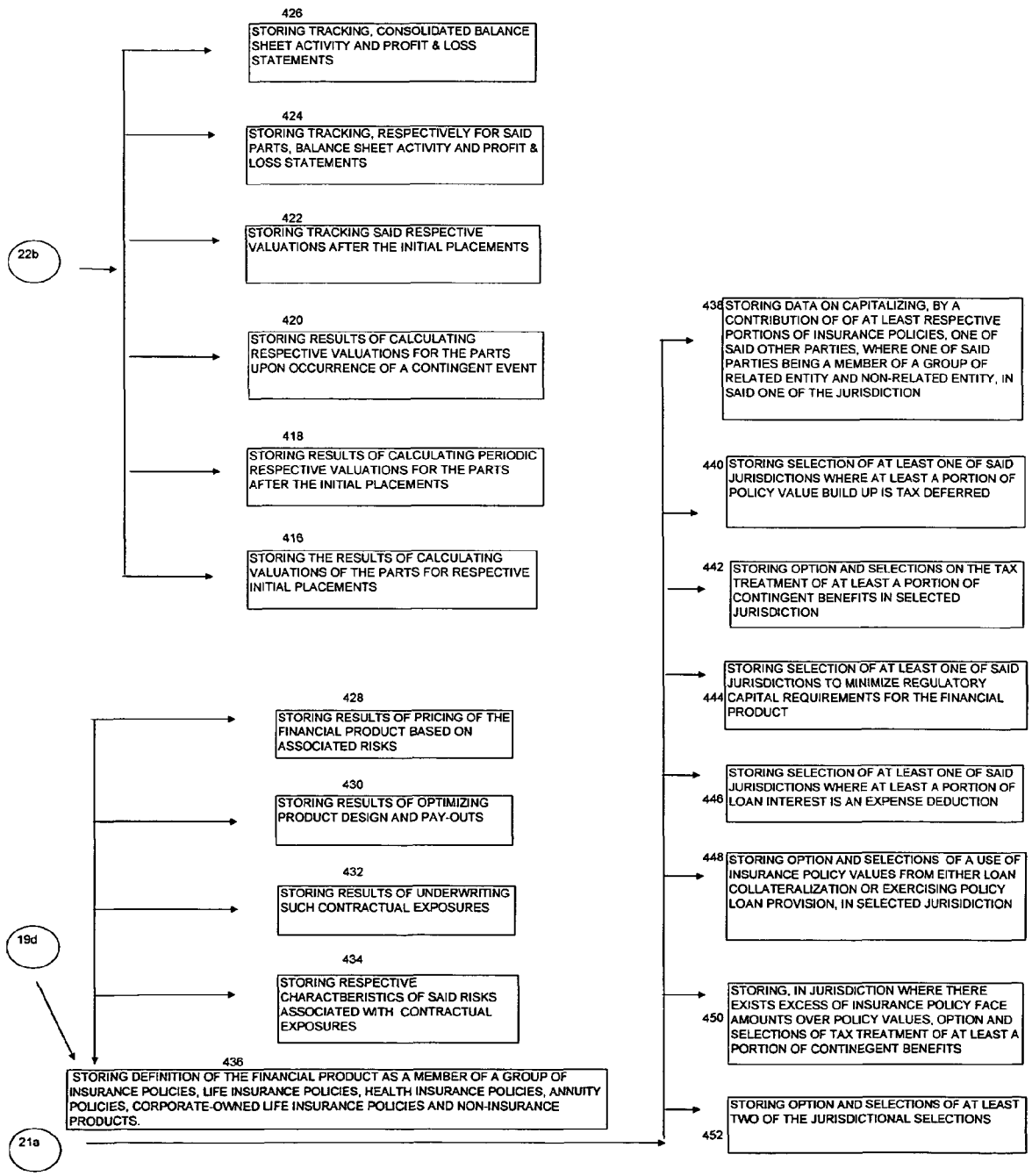

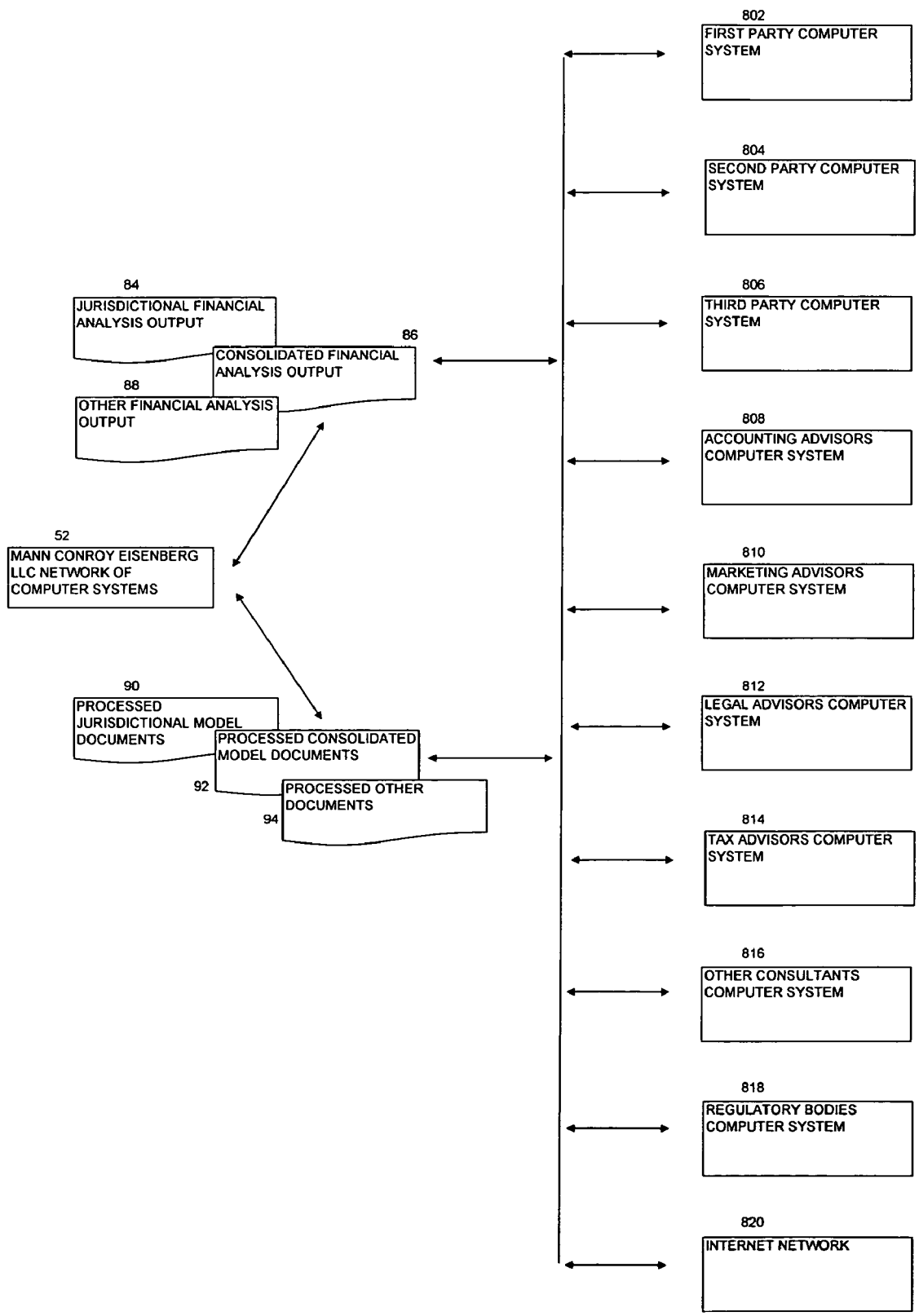

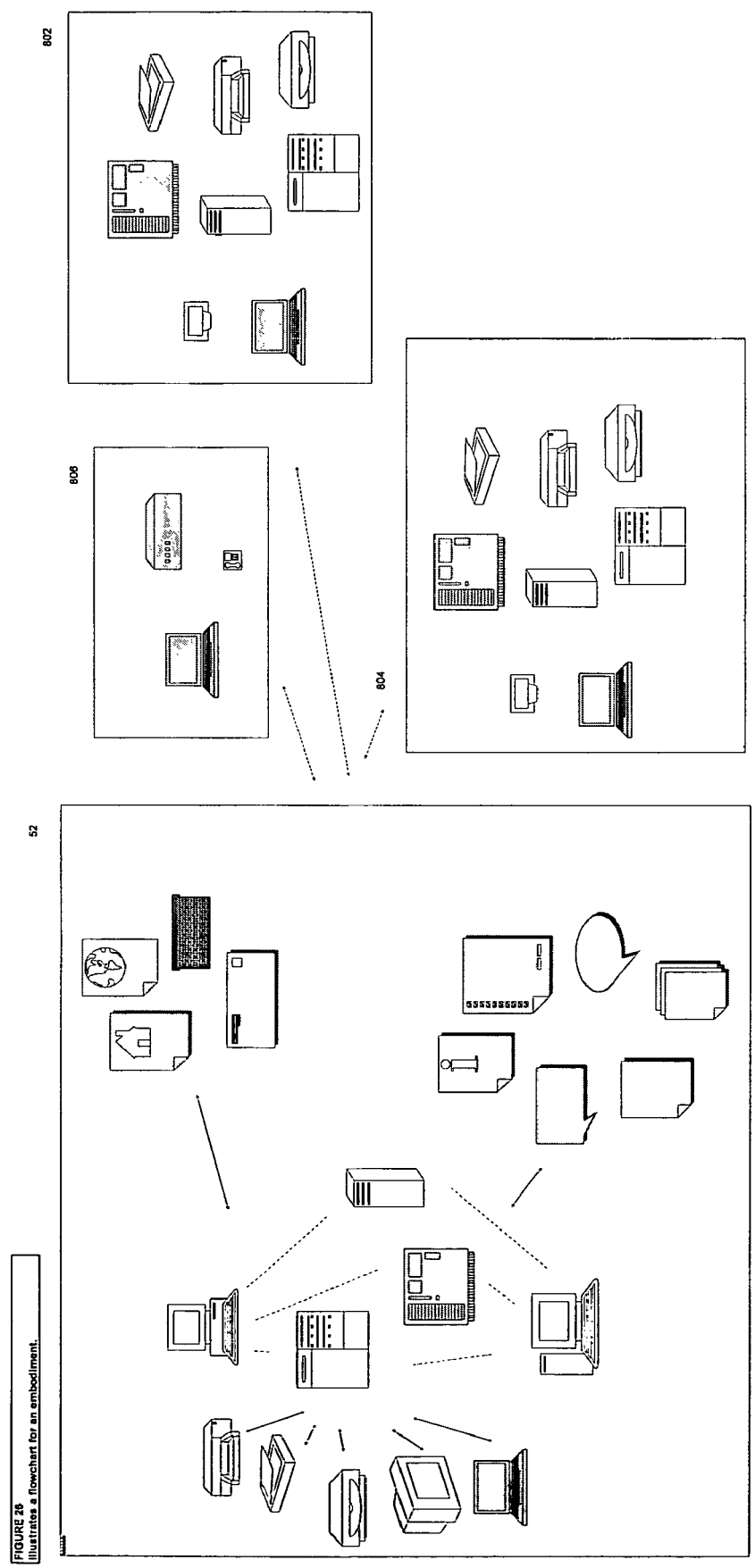

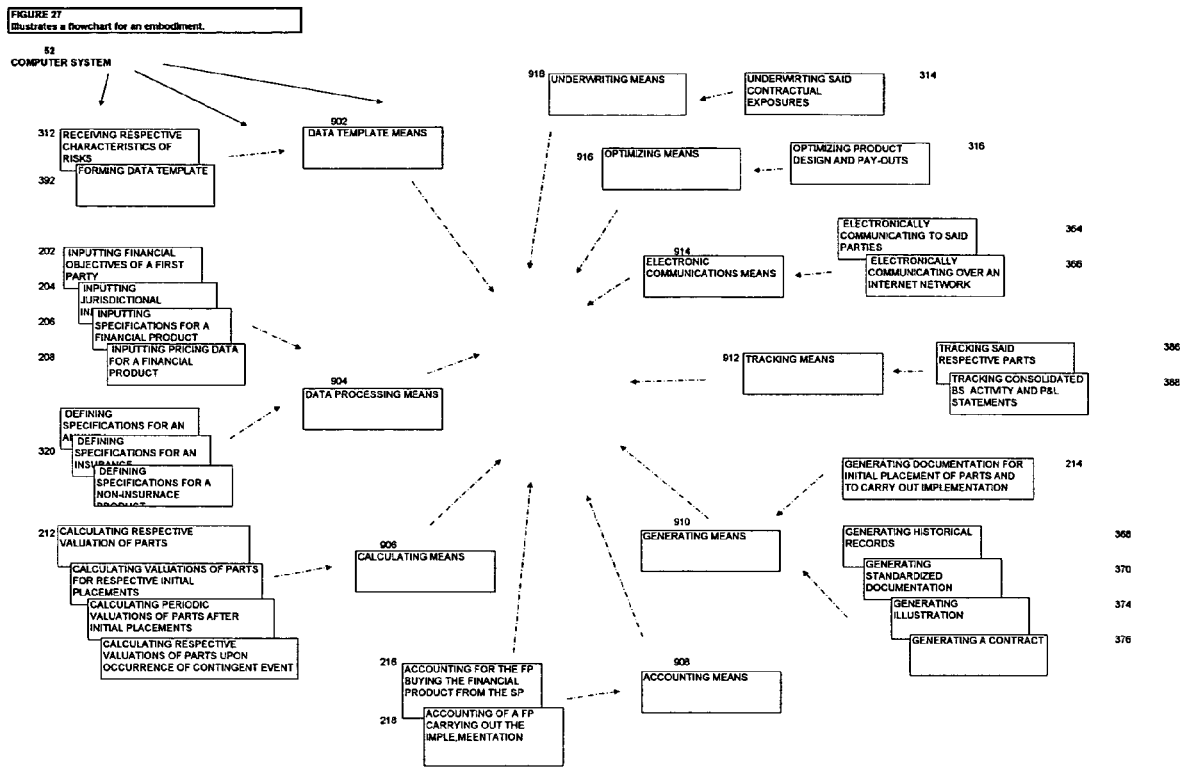

COMPUTER SUPPORT FOR MULTI-JURISDICTIONAL INVESTMENT

I. PRIORITY

This application claims priority from, and incorporates by reference, U.S. Patent Application Ser. No. 60/468,284 filed May 5, 2003, and that PCT patent application titled "Computer Support for Multi-Jurisdictional Investment," filed May 4, 2004, filed with Express Mail label ER182437606 with inventor applicants listed as the inventors above.

II. TECHNICAL FILED

The technical field is computers and data processing systems, as illustrated more particularly herein. Exemplary embodiments include, depending on the implementation, apparatus, a method for use and method for making, and corresponding products produced thereby, as well as data structures, computer-readable media tangibly embodying program instructions, manufactures, and necessary intermediates of the foregoing.

III. BRIEF DESCRIPTION OF THE DRAWINGS

Figure 1:
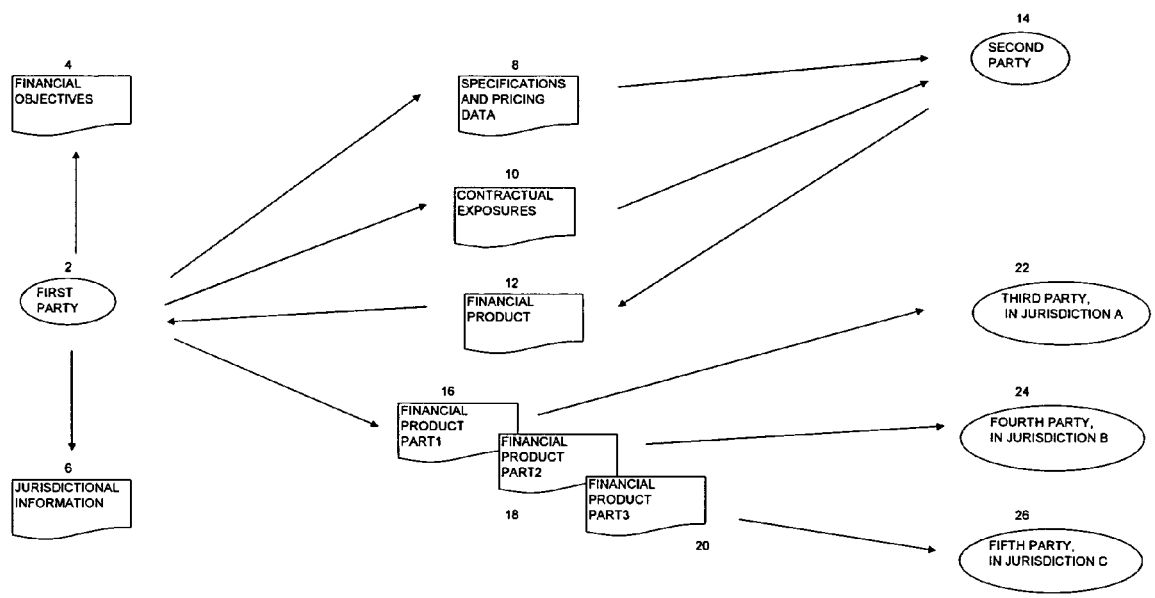
Figure 2:
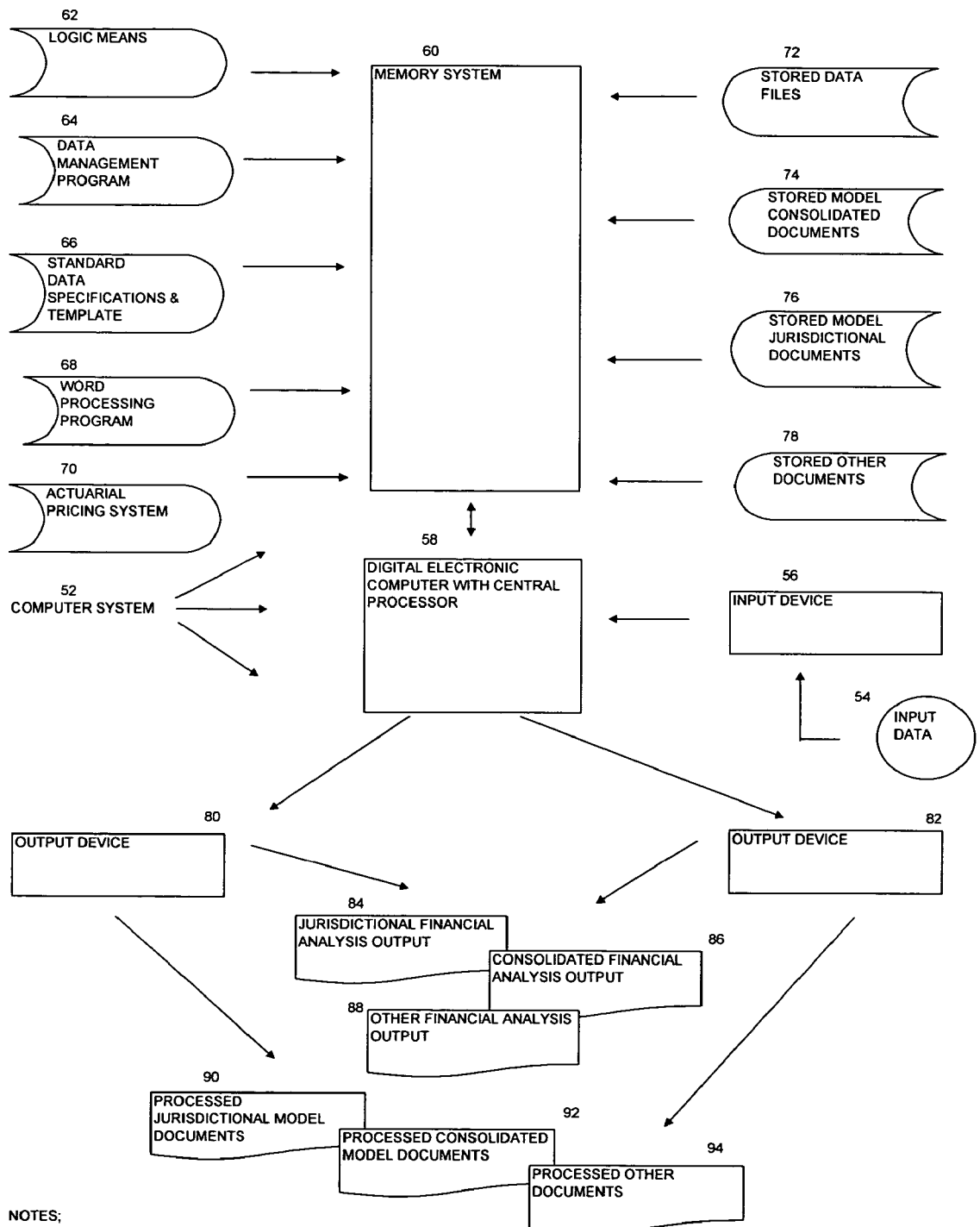
Figure 3:
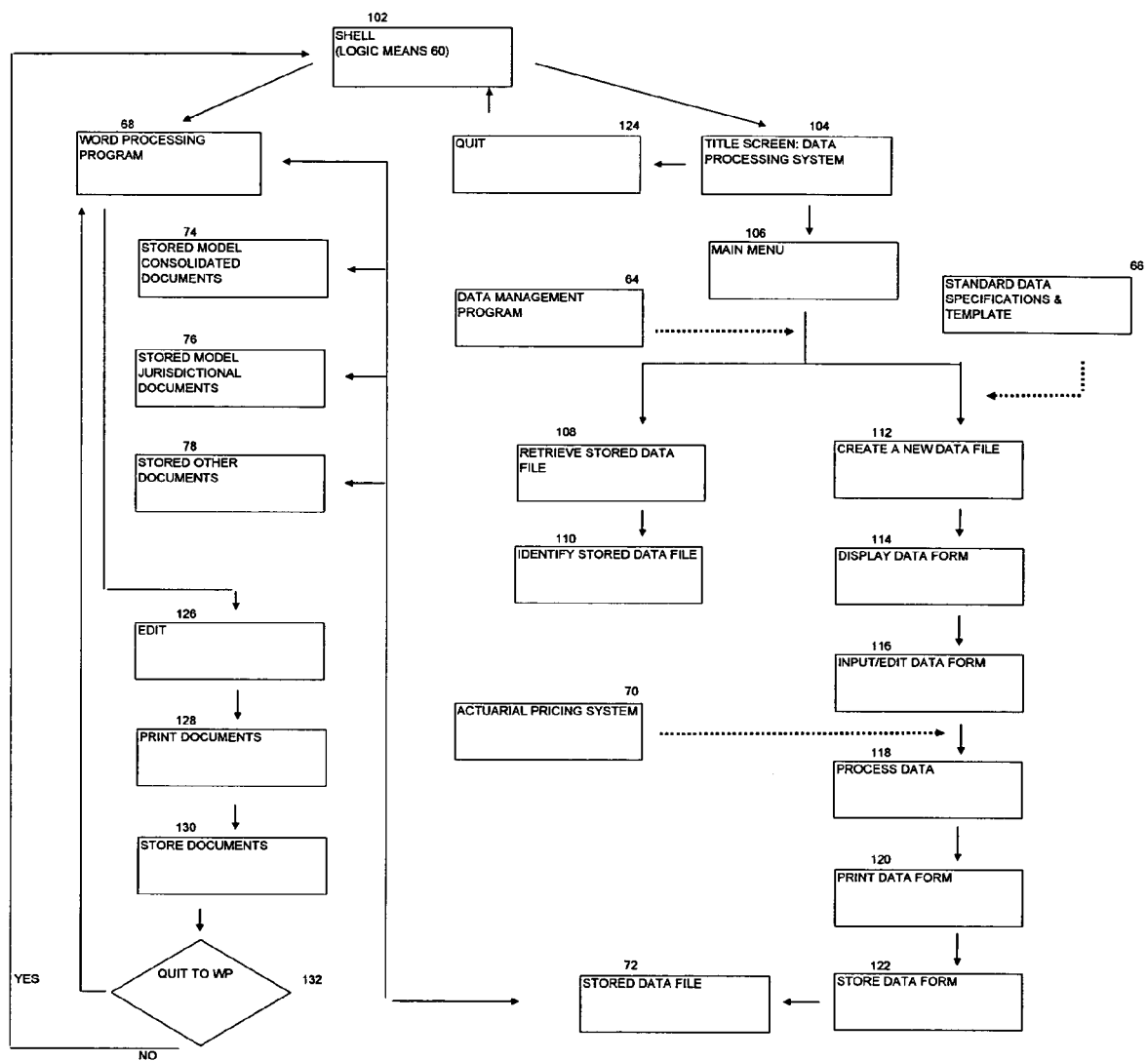
Figure 4:
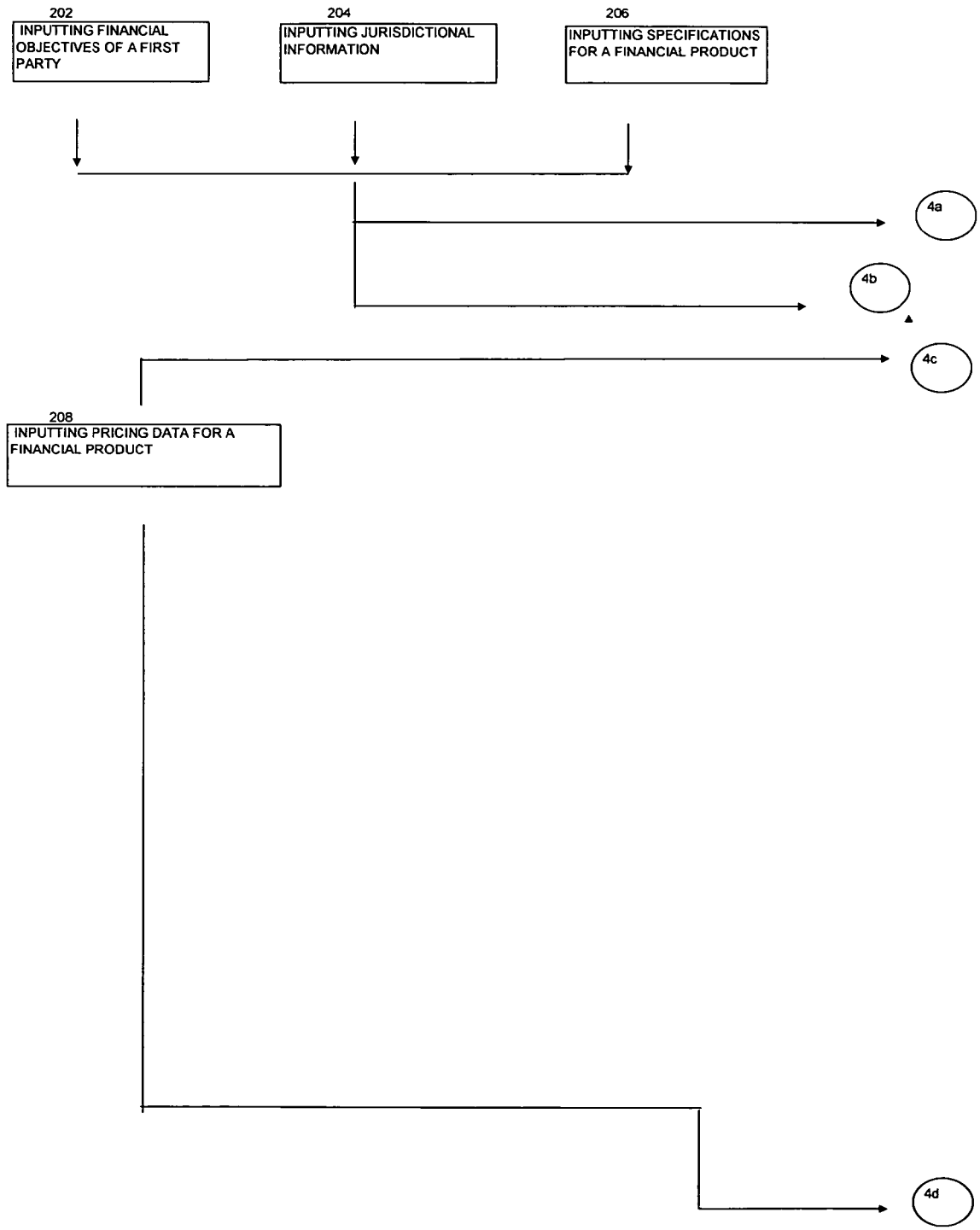
Figure 5:
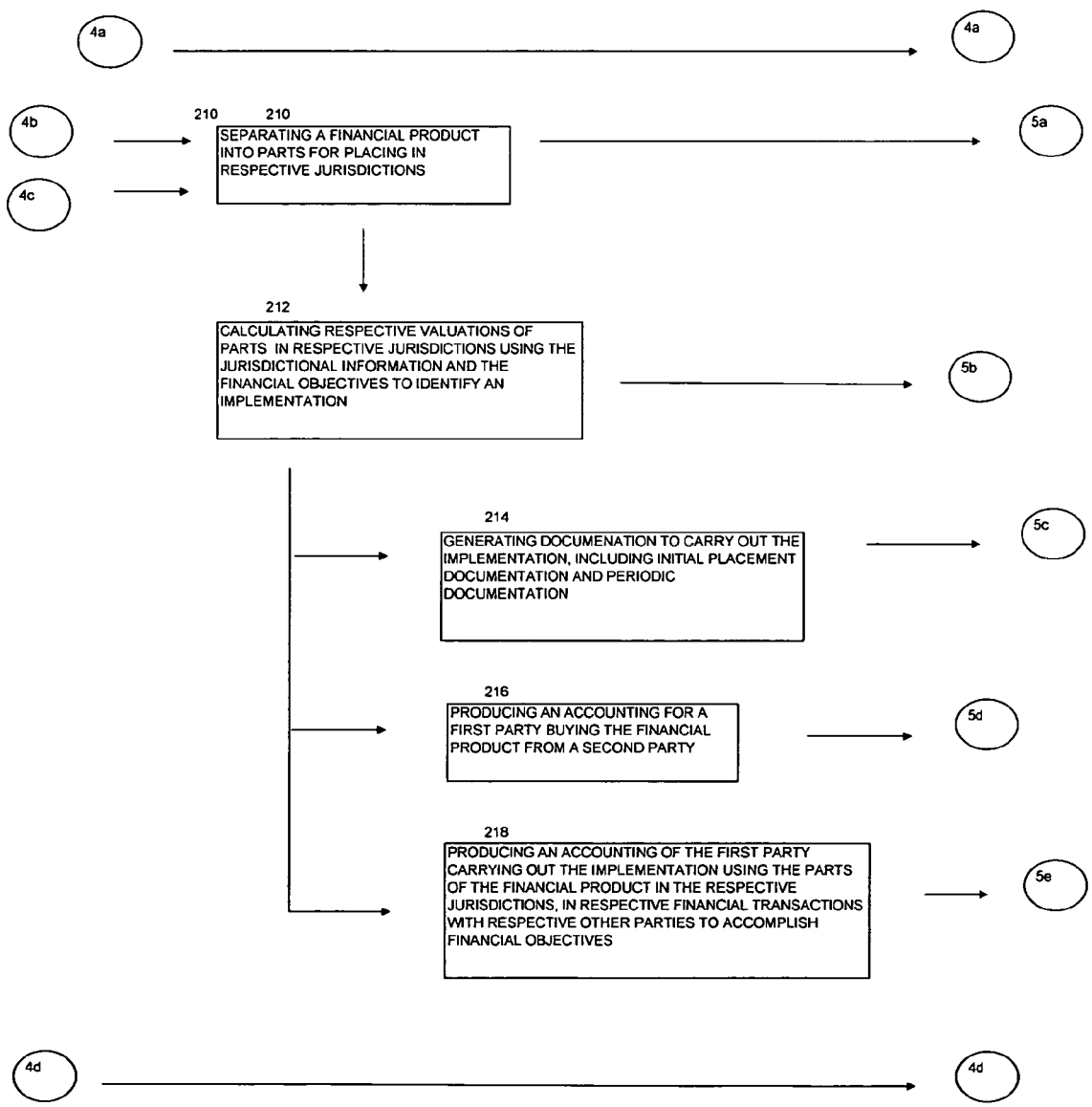
Figure 6:
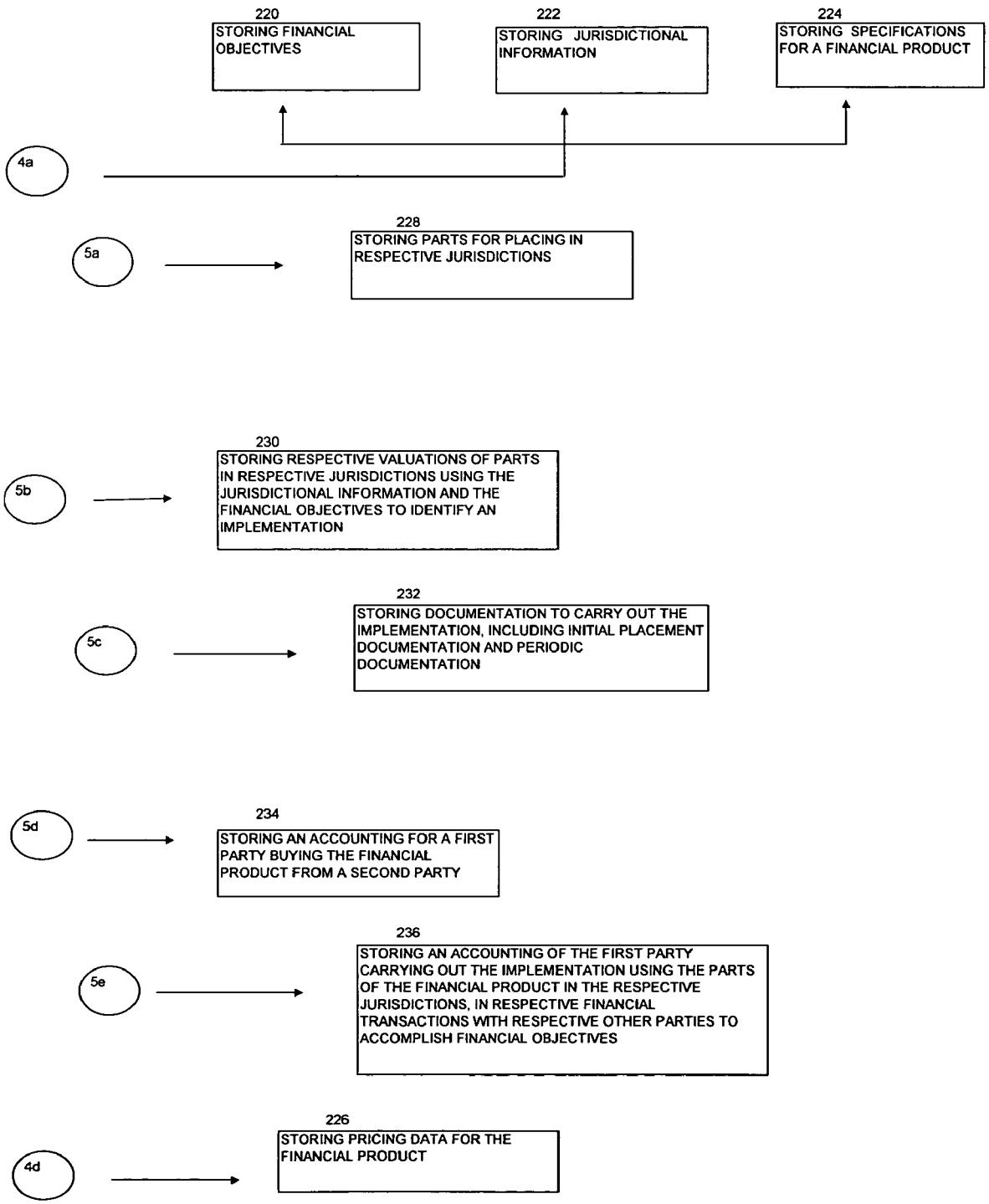
Figure 7:
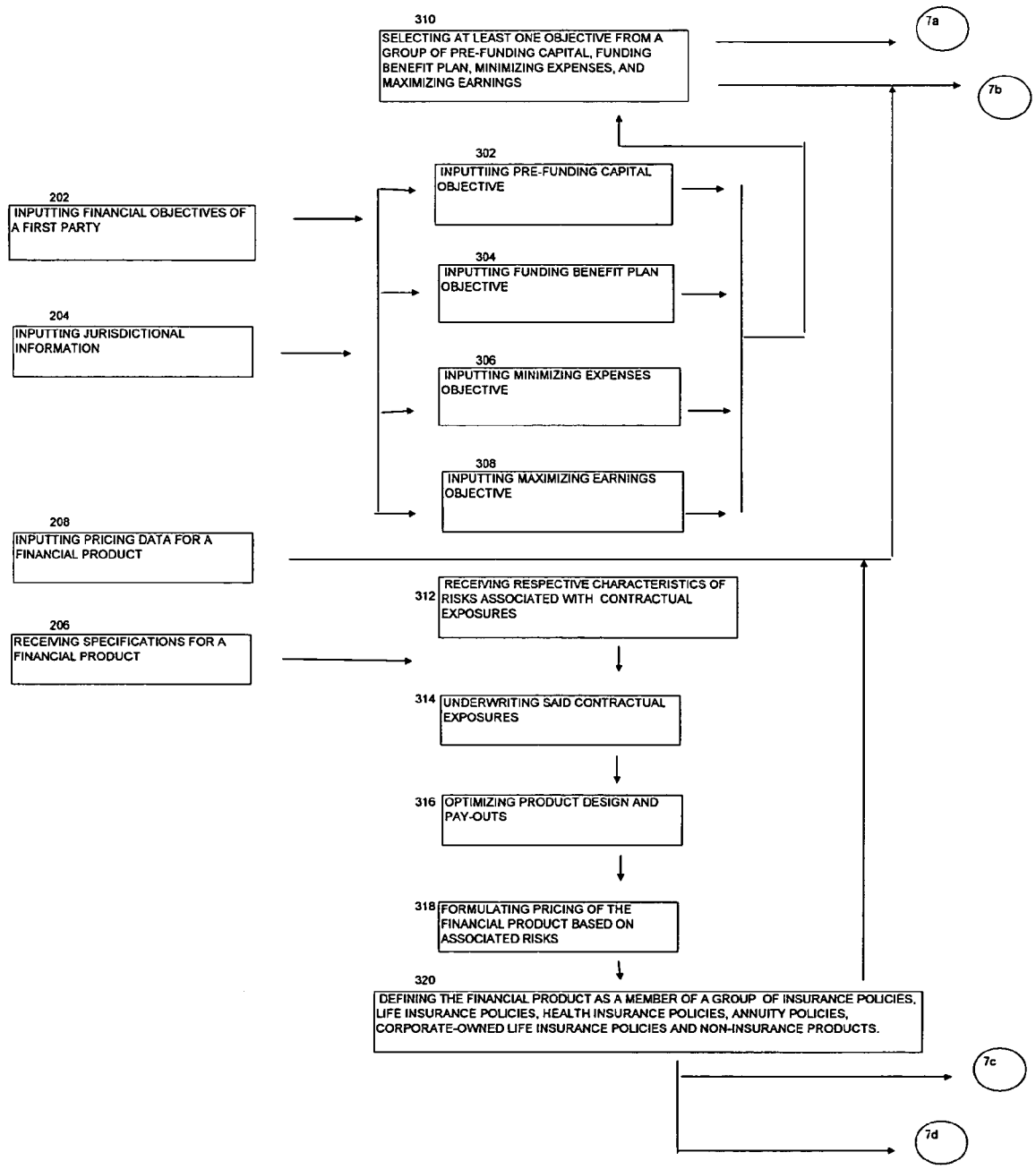
Figure 8:
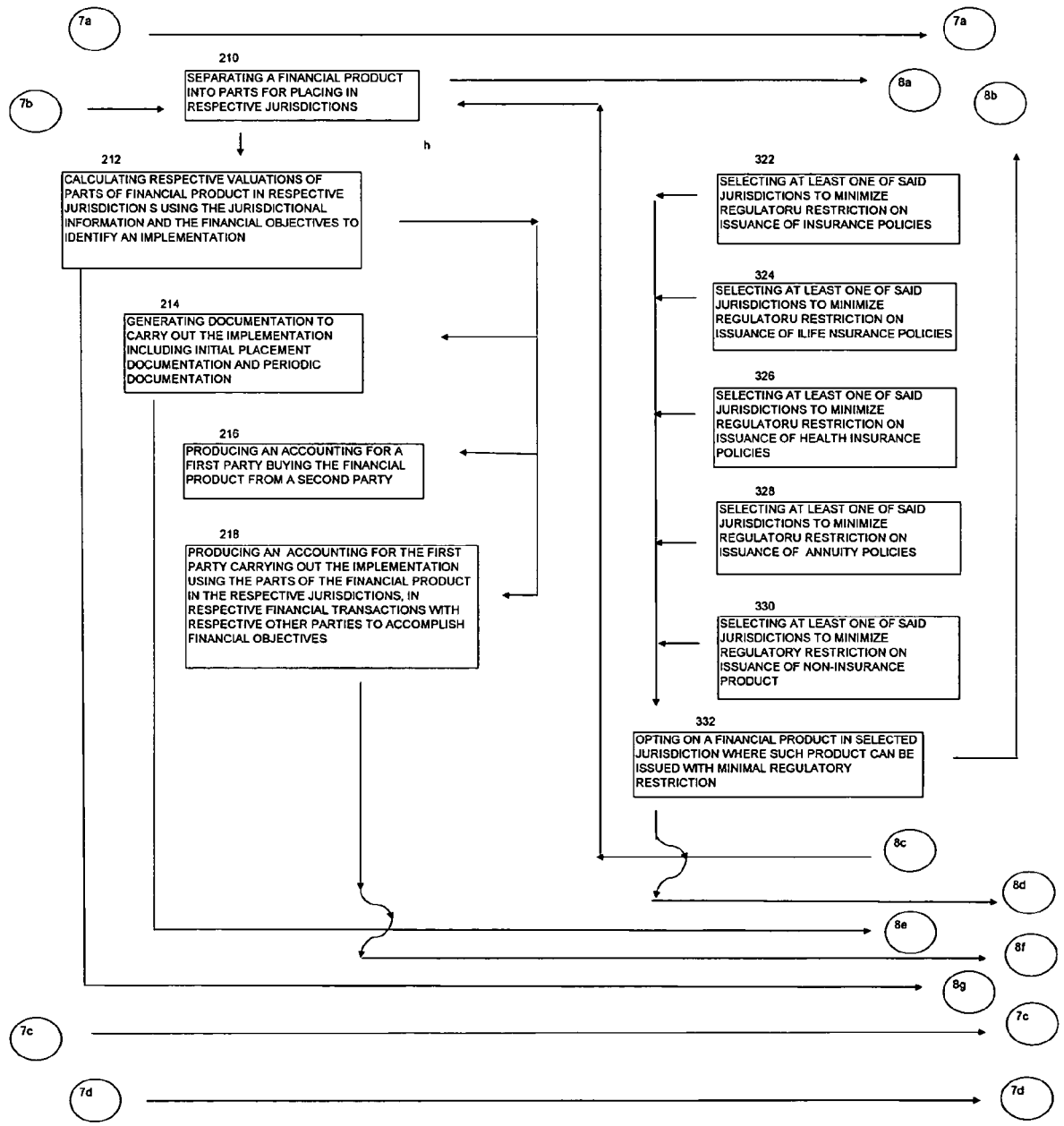
Figure 9:
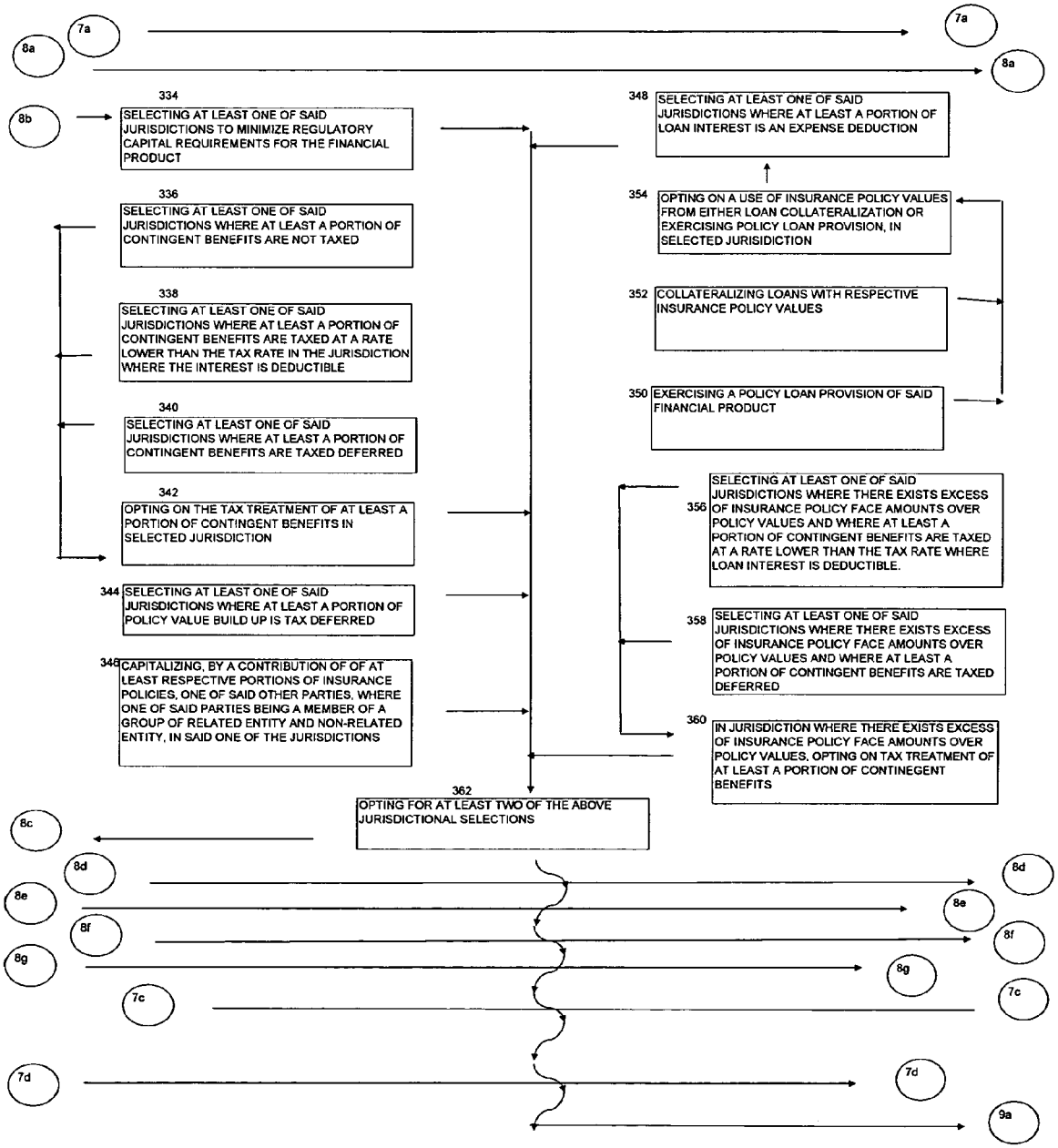
Figure 10:
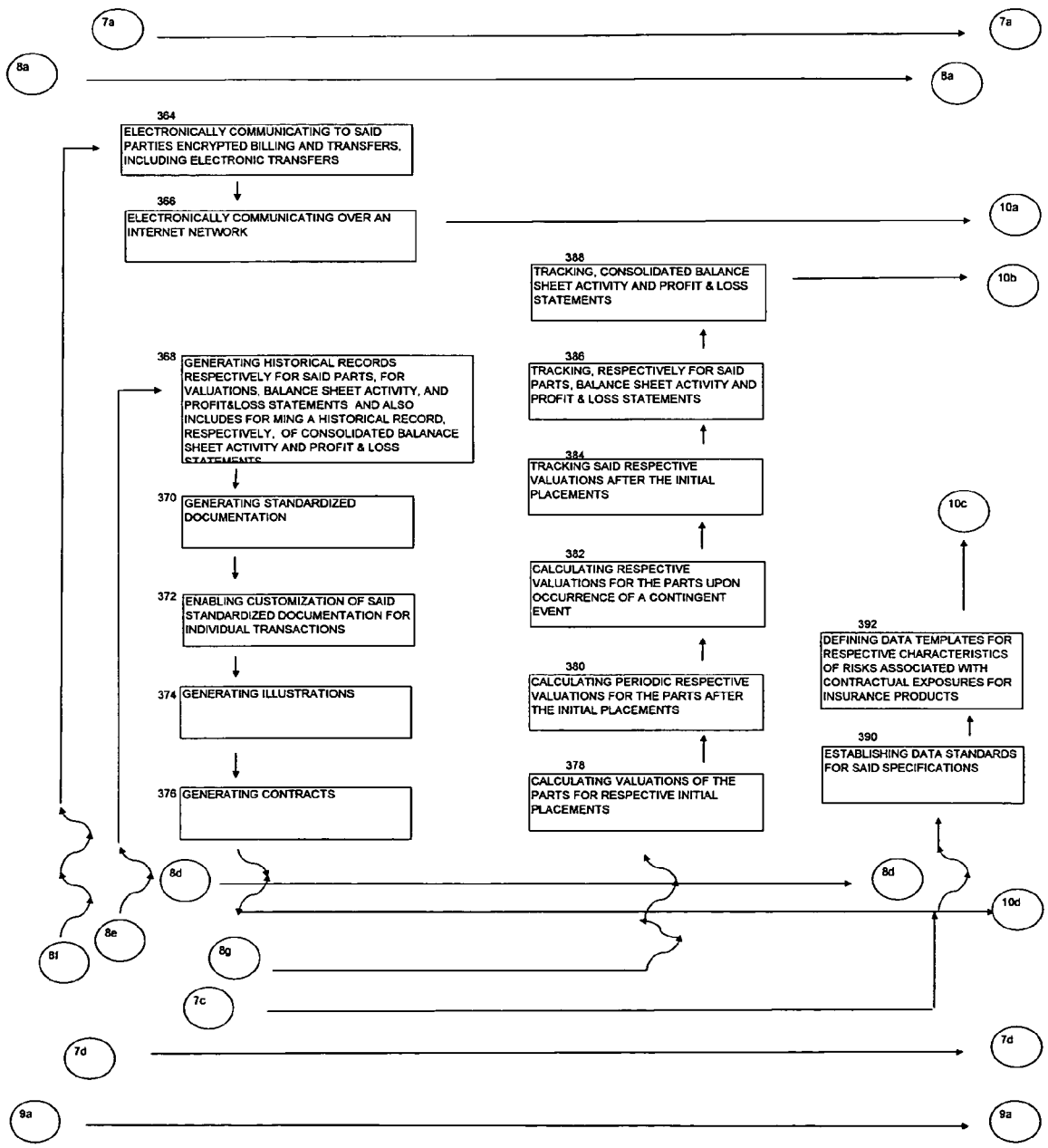
Figure 11:
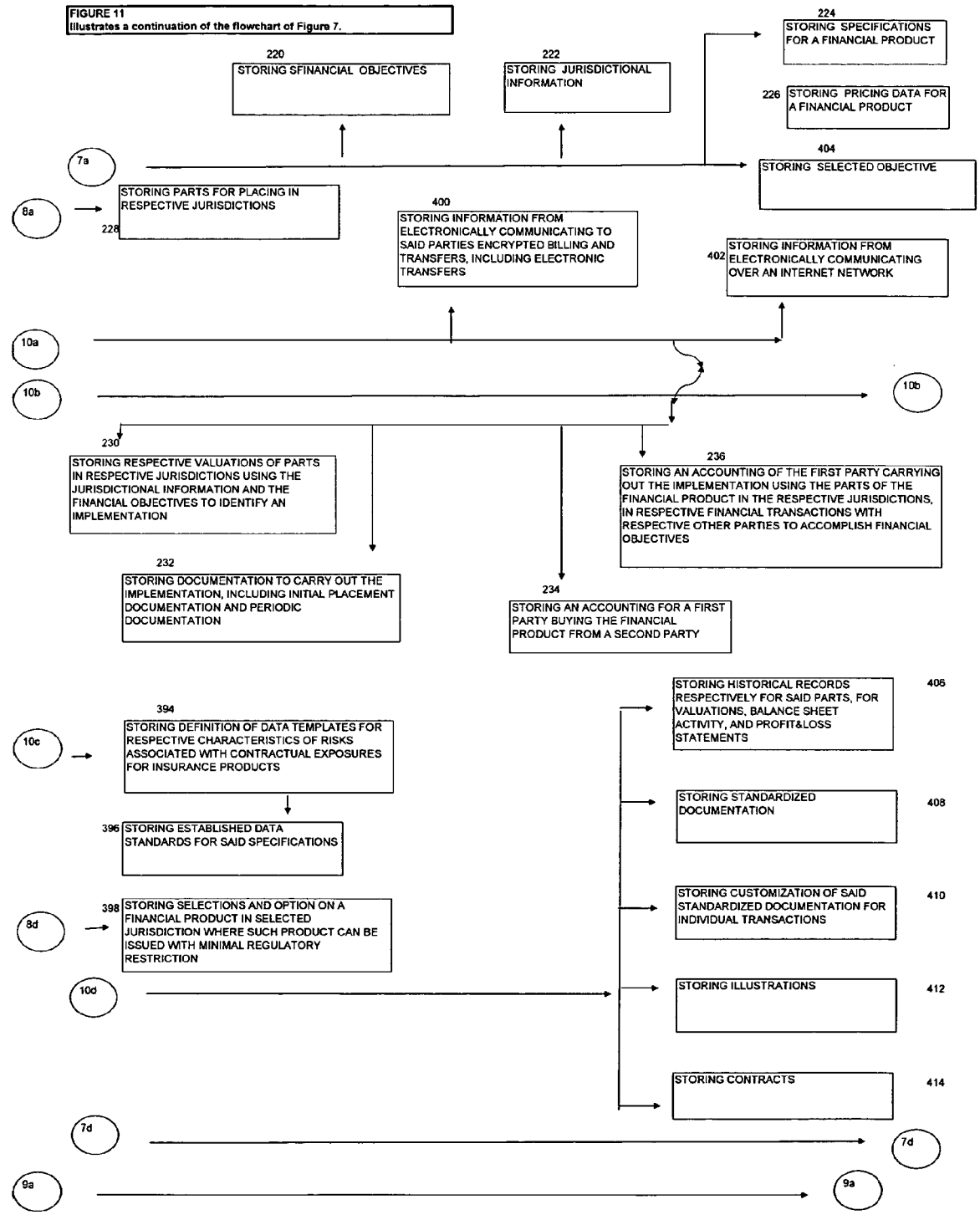
Figure 12:
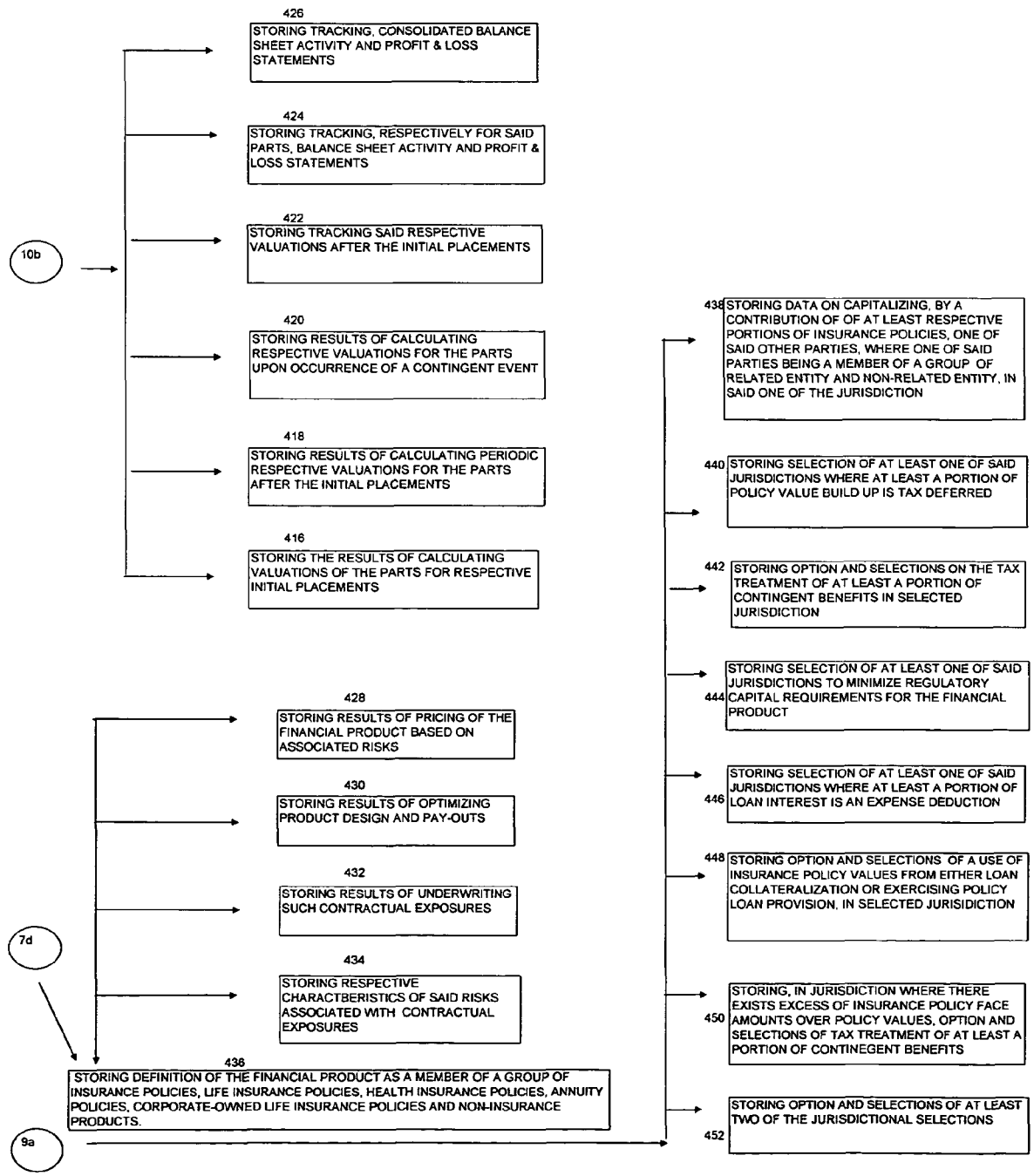
Figure 14:
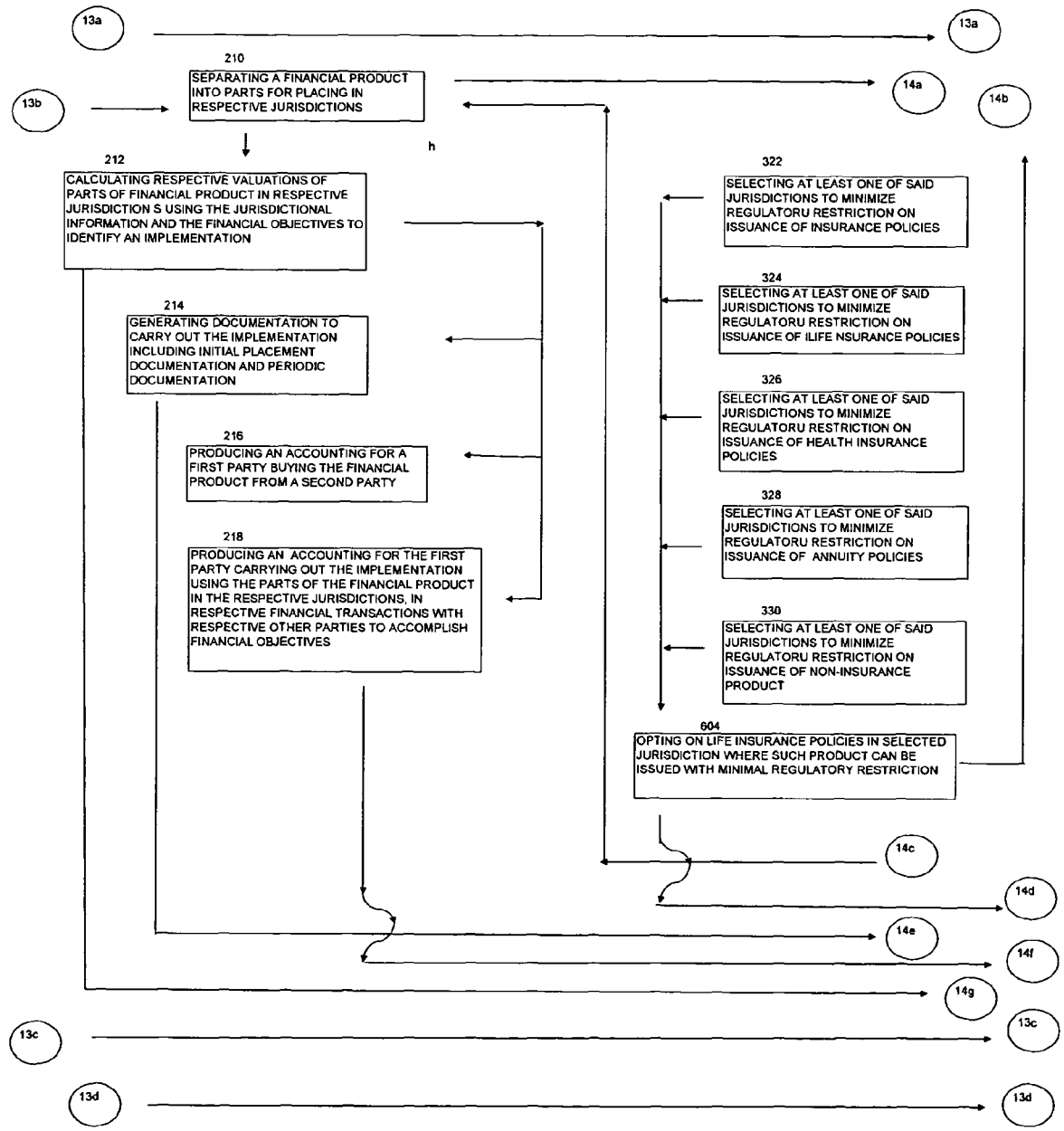
Figure 15:
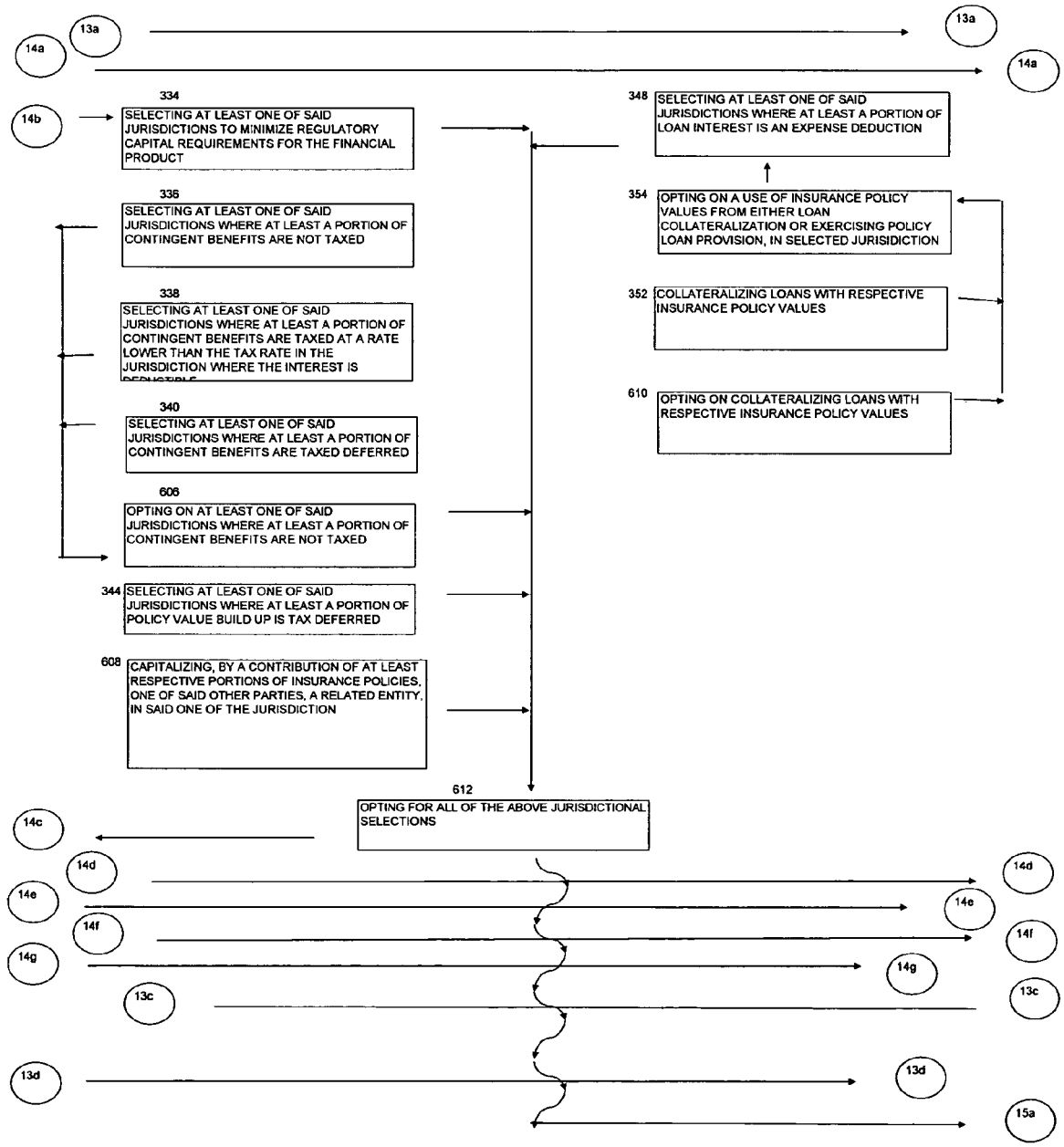
Figure 16:
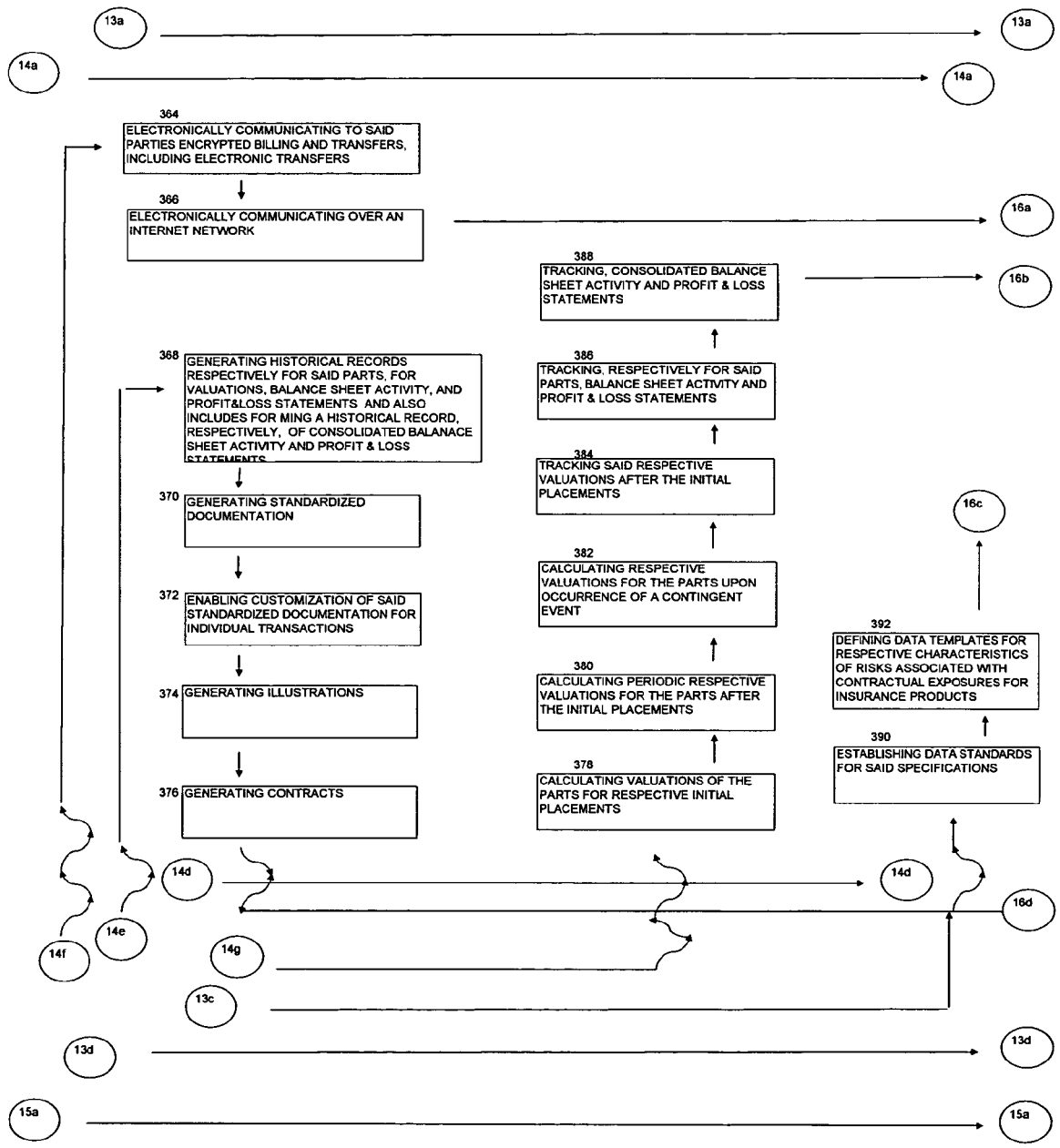
Figure 17:
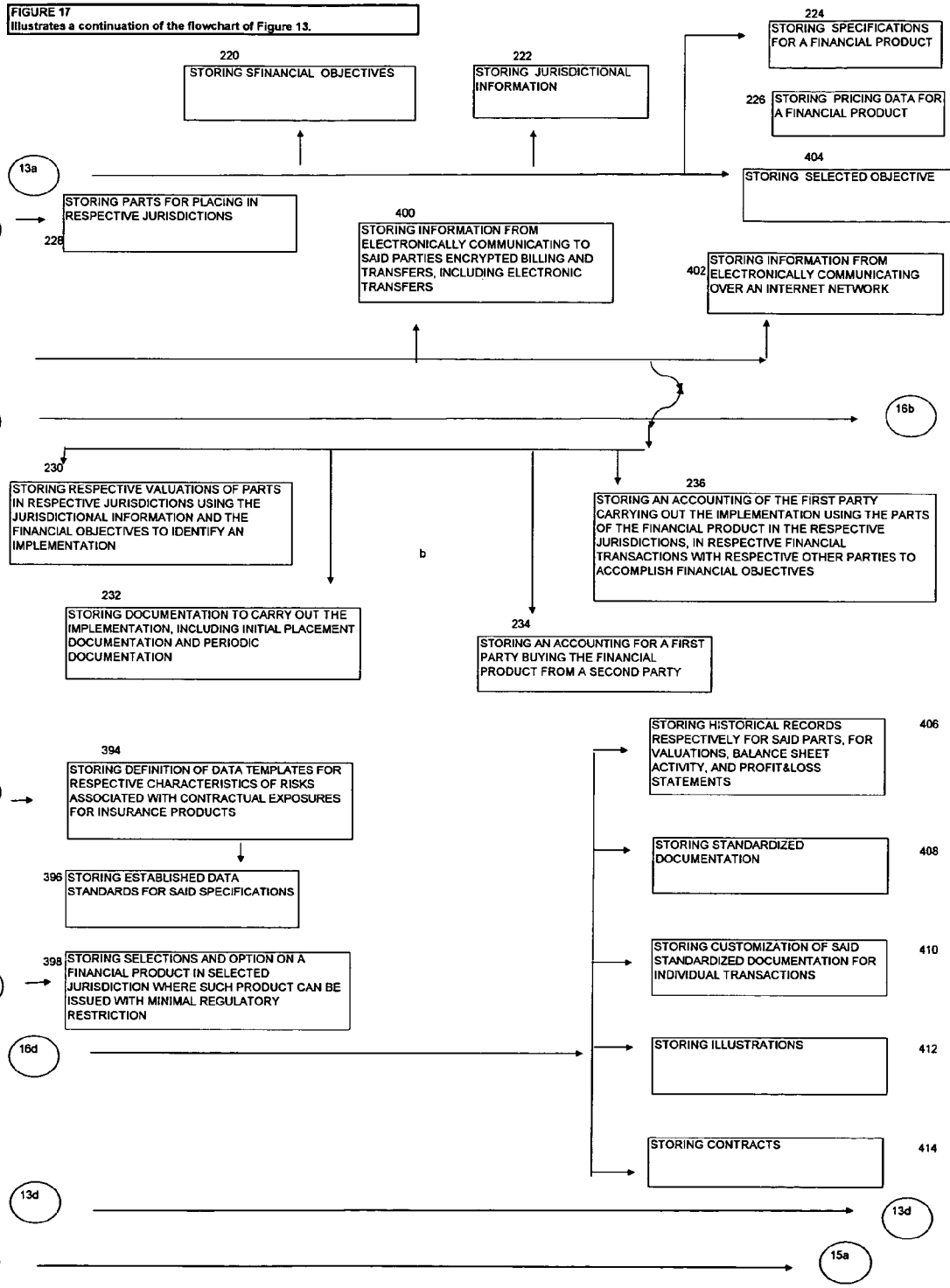

FIG. 1 illustrates an overview of an embodiment.
FIG. 2 illustrates an embodiment.
FIG. 3 illustrates a flow chart for an embodiment.
FIG. 4 illustrates a flow chart for an embodiment.
FIG. 5 illustrates a continuation of the flow chart of FIG. 4.
FIG. 6 illustrates a continuation of the flow chart of FIG. 4.
FIG. 7 illustrates a flow chart for an embodiment.
FIG. 8 illustrates a continuation of the flow chart of FIG. 7.
FIG. 9 illustrates a continuation of the flow chart of FIG. 7.
FIG. 10 illustrates a continuation of the flow chart of FIG. 7.
FIG. 11 illustrates a continuation of the flow chart of FIG. 7.
FIG. 12 illustrates a continuation of the flow chart of FIG. 7.
FIG. 13 illustrates a flow chart for an embodiment.
FIG. 14 illustrates a continuation of the flow chart of FIG. 13.
FIG. 15 illustrates a continuation of the flow chart of FIG. 13.
FIG. 16 illustrates a continuation of the flow chart of FIG. 13.
FIG. 17 illustrates a continuation of the flow chart of FIG. 13.
FIG. 18 illustrates a continuation of the flow chart of FIG. 13.
FIG. 19 illustrates a flow chart for an embodiment.
FIG. 20 illustrates a continuation of the flow chart of FIG. 19.
FIG. 21 illustrates a continuation of the flow chart of FIG. 19.
FIG. 22 illustrates a continuation of the flow chart of FIG. 19.
FIG. 23 illustrates a continuation of the flow chart of FIG. 19.
FIG. 24 illustrates a continuation of the flow chart of FIG. 19.
FIG. 25 illustrates a flow chart for an embodiment.
FIG. 26 illustrates a flow chart for an embodiment.
FIG. 27 illustrates a flow chart for an embodiment.

IV. MODES

The accompanying drawings illustrate embodiments intended to illustrate and exemplify in a teaching manner.

As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality. Logic flow can represent signal processing, such as digital data processing, communication, or as evident from the context hereinafter. Logic flow can be implemented in discrete circuits. Computer-readable media, as used herein can comprise at least one of a RAM, a ROM, A disk, an ASIC, and a PROM. Industrial applicability is clear from the description, and is also stated below.

By way of the following prophetic teaching, there is provided computer support, as in a data processing system, for implementing parts of, or from, a financial product or instrument to accomplish certain financial objectives. Financial objectives can include utilizing capital more effectively, taking advantage of different risk tolerances, improving earnings, facilitating capital movement, funding employee benefits, reducing expenses and taxes, pre-funding capital needs, etc. Accomplishing financial objectives can involve a bifurcation (trifurcation, etc.) of the parts of the financial product, preferably to place the parts into different national, regulatory, accounting, tax, etc., jurisdictions, to accomplish one or more financial objectives that could not be accomplished as effectively in only one jurisdiction. This is the meaning herein for "jurisdictions."

Conceptually, this can involve, for example, a holding company (HCx), which, in a specific jurisdiction x, writes life insurance policies on the lives of employees or other persons in which it has an insurable interest. HCx then takes out a loan using the insurance policies as collateral. Interest on a loan used to fund a business operation could be an expense deduction for tax purposes in jurisdiction x. In one embodiment, death proceeds are moved to a subsidiary (ASy) with potential future capital needs in jurisdiction y, where death benefits may be taxed more favorably.

Of course, this idea can be carried out with other particular jurisdictions, with other financial objectives, and with other financial products in making use of the general idea of utilizing multi-jurisdictional advantages applied to implementing the financial products (e.g., annuities, endowments, disability income, other non-insurance financial products or instruments, etc.) Financial objectives can be for funding or pre-funding future capital needs, reducing expenses and taxes or any other financial objective that could not be accomplished as efficiently without this approach.

More particularly as a representative example, consider a Capital Funding Insurance Program (CFIP). A corporation takes out life insurance on the lives of certain employees, retirees or other persons in which it has an insurable interest. The corporation is the owner, premium payer and beneficiary of the insurance policies. CFIP can be used as a tax-favored funding vehicle for long-term liabilities, or to generate an efficient return for pre-funding future capital needs.

In jurisdiction x, CFIP can be used in a twofold manner. First, jurisdiction x Holding Company (HCx) buys CFIP and contributes the policies or the net amount at risk death benefits to an active subsidiary (ASy) in jurisdiction y, where death benefits are tax-favored, to build long-term capital in the subsidiary at a lower cost, while possibly repatriating on a favorable tax basis.

Second, when cash is desired by HCx for its use, the policies can be used as collateral for loans, either bank loans or policy loans, to fund this need. Loan interest on these loans may be tax-deductible by HCx.

One need, for example, is to generate cash flow for HCx's pension plan; additional benefits, at least from an accounting standpoint, can occur. This can be carried out, for example, by creating a contract between HCx and the pension plan, which commits HCx to use dividends from ASy, arising from ASy's receipt of death proceeds, as contributions to the pension plan. Alternatively, the dividends could be used to help fund other post retirement benefits.

In a representative embodiment, HCx insures, with whole life insurance, the lives of a group of employees, retirees or other persons in which it has an insurable interest. HCx may pay the premiums and is owner and beneficiary of the policies.

If HCx borrows funds for a legitimate business purpose(s) from an unaffiliated lender, secured by the policy cash values as collateral, HCx can use the collateral on a favorable basis. Some examples of legitimate business purpose are to pay HCx operating costs, pay down other debt obtained for HCx, or make HCx capital investments.

HCx then may contribute the policy to ASy, and ASy holds the policy until death. ASy is not liable on the loan; however, the cash values remain as security for the loan. The cash value is recorded as an asset of ASy, producing an immediate capital increase in ASy, and any future increases in cash value are recorded on ASy's accounts. HCx may continue to borrow against any cash value increases. At death, ASy receives the proceeds on a tax-favored basis.

The loan to HCx becomes due and is paid by HCx. Should HCx then need funds, and ASy has excess funds, then ASy may dividend all or a portion of the proceeds to HCx.

In another embodiment, HCx insures, with whole life insurance, the lives of a group of employees, and, perhaps, retirees or other person's in which it has an insurable interest. HCx pays the premiums and is the owner of the policies.

HCx designates as beneficiaries, itself for a portion of the death benefit, and ASy, which will need long term capital at some point, for the remainder.

Again, HCx can use the policy as collateral for loans to pay its operating costs, pay down other debt obtained for local uses, etc. The loan could be a standard policy loan, which is "non-recourse" to HCx and provides that the insurer can apply the policy cash value or its portion of the death proceeds to pay the loan should the loan ever exceed the cash value or when the policy matures. HCx pays the interest on the loans.

At death, HCx receives its portion of the proceeds, less the loan balance, as the insurer applies HCx's portion to pay the loan. The subsidiary receives the excess of the face amount over HCx's portion. Should HCx then be in need of funds and ASy has excess funds, then ASy may dividend all or a portion of its proceeds to HCx.

In sum, while the foregoing and hereinafter offers an advance in the context of a structured transaction system, aspects can extend to facilitating operation of an electrical communication system, enabling machine or manufacture coordination in different jurisdictions. Thus, computer support and aspects thereof are arranged and configured to carry out one or more aspects of the transactions, (e.g., documentation, tracking, valuation, tax handling, accounting, etc.) involving and separating a financial product (e.g., comprising an investment, rights, consideration, benefits, etc., depending on the context) and its various parts, in different jurisdictions. This multi-jurisdictional structure is coordinated to accomplish a financial objective that could not be accomplished as efficiently without this approach.

The computer support can handle inputting data on the policies and insureds, analyzing the data to determine the best approach to the multi-jurisdictional use of the parts of the policies and/or rights and/or benefits or responsibilities associated therewith, etc., generating documentation, producing illustrations and reports, contracts, accounting and accounting results, particularly for the parts and in correspondence to the jurisdictions, consolidated data, etc. Preferably there are multi-jurisdictional computer systems for access, and the human steps facilitating the entire computer-assisted system can span even more jurisdictions. In view of the complexity of the transactions associated with this innovation, it may be best to establish standardization, especially with data standards. Thus, an embodiment contemplates data standards carried out from data templates and generally standardized documentation (with customization as may be desired for individual transactions).

Indeed, computer support for a multi-jurisdictional approach can reach to many related activities, including optimizing, product fulfillment, underwriting, optimizing pay outs, communications with all involved parties (including providers, intermediaries, etc.), tracking, billing and transfers (including electronic funds transfers), protected communications by encryption, records management, real time and batch processing utilizing distributed networks and Internet communications, product partitioning and determinations related thereto, as well as packaging benefits and parts thereof, budgeting, claims processing, reporting, and coding to track aspects of this multi-jurisdictional approach, partitioning optimization and analysis, and even business to business referrals for associated products and services.

In accordance therewith, there is an apparatus (computer system(s)), methods of making and using the apparatus, and products (documentation and other output) as well as necessary intermediates (e.g., data, documents, etc.), as discussed more with regard to the Figures.

FIG. 1 illustrates an overview of an embodiment with a graphic representation of transactions for implementing financial objectives, using parts of a financial product and placing such parts in multi-jurisdictions. This illustration shows the nature of the transaction that gives rise to need for the computer system, standardized data specifications, template input, and other aspects discussed herein.

Capital management as a corporate activity can utilize investments, or financial products, comprising insurance, finance, and the like. As corporate groups becoming global in structure, contractual exposures (e.g., with respect to benefit payments to individuals or to groups of individuals) can be handled in a multi-jurisdictional manner. Insurance or reinsurance contracts obtained by corporations in such groups can provide actual cash flows upon the occurrence of certain contingent events specified in the contracts. A contingent event can, for example, be death, disability, survivorship, or the like. As an overview, means is provided for (1) meeting capital needs in an efficient manner, (2) utilizing multi-jurisdictional transactions as made possible by global structures, and (3) bifurcating (trifurcating, etc.) financial products, for example insurance products, into parts and placing them in multiple jurisdictions.

By way of an example, a First Party 2 defines one or more Financial Objectives 4. Jurisdictional Information 6 relevant to the global structure of First Party 2 can be analyzed. In a transaction with Second Party 14, First Party 2 provides Specifications and Pricing Data 8 for a financial product and further provides data regarding associated Contractual Exposures 10 for the financial product. In turn Second Party 14 can tailor or develop the Financial Product 12 so as to be suited to the needs of First Party 2. First Party 2 facilitates separating parts of Financial Product 12 into Financial Product Part 1, Financial Product Part 2, and Financial Product Part 3, and places them in jurisdiction A, jurisdiction B and jurisdiction C, respectively, in transactions with Third Party 22, Fourth Party 24, and Fifth Party 26. Such transactions allow First Party 2 to meet Financial Objectives 4 as mentioned previously. Any of the foregoing regarding Financial Product 12 being separated into at least two parts and placed in at least two jurisdictions in transactions with more than one party, is handled with computer support.

Thus, in a broad sense, the Computer System 52 is prescribed by the overall transaction so as to encompass separately, and in combination, the facets of the transaction, as well as enable ongoing support after placement of the parts. Accordingly, the methods for making the computer system, using the computer system, and components thereof are prescribed by separate and collective aspects of the transaction (in the nature of implementing financial objectives in multiple jurisdictions between a First Party 2 (a corporate entity) and other parties (some related and other non-related entities). These transactions enable First Party 2 to implement Financial Objectives 4, utilize Jurisdictional Information 6 using parts of Financial Product 12 with other parties. Computer interrelations and system-to-system communications are also embodiments for separate and collective consideration.

FIG. 2 illustrates an embodiment of aspects of one manner of equivalent-functionality approaches to multi-jurisdictional capital management via a computer system. Such representative manner of computer system is provided in graphic presentation. Consider Computer System 52 that can be adapted to handle one or more of the following: (i) manipulates digital signals of (a) Input Data 54 pertaining to the Financial Objectives 4, Multi-jurisdictional Information 6, Specifications and Pricing Data 8, Contractual Exposures 10, and Financial Product 12, (b) model documents (with so as to define data standards) of Stored Model Consolidated Documents 74, Stored Model Jurisdictional Documents 76 and Stored Other Documents 78, and (c) previously encoded and processed data Stored Data Files 72; (ii) digital processing of these signals to produce output (discussed further below), but for example, analyses of the data under one or more assumptions; (iii) documents of results Jurisdictional Financial Analysis Output 84, Consolidated Financial Analysis Output 86, and Other Financial Analysis Output 88; and (iv) illustrates selected results in Processed Jurisdictional Model Documents 90, Processed Consolidated Model Documents 92, and Processed Other Documents 94.

Computer System 52 is intended to be carried out in any number of ways, but in a general sense there can be a Digital Electronic Computer (e.g., an IBM Personal Computer) with Central Processor 58 (e.g., an Intel series processor), a Memory System 60 (such as a hard drive), an Input Device 56 (keyboard, mouse, modem, or the like), and one or more output devices, here shown as Output Device 80 and Output Device 82 (e.g., a Hewlett Packard printer, a Dell monitor, a modem, or other such output device). The Memory System 60 can include an operating system Logic Means 62 to run the Computer System 52 and facilitate applications software. For example, the operating system could be Microsoft XP Professional that would allow use of (a) its applications software, such as EXCEL, ACCESS, and WORD, and (b) actuarial pricing systems compatible with Microsoft XP Professional such as AXIS, TAS, or PROPHET. The Memory System 60 can store other program(s), such as the foregoing, i.e.: (a) a Word Processing Program 68 such as Microsoft Word to process transactions data, assumptions, and results, (b) a Data Management Program 64 such as Microsoft EXCEL or ACCESS to manage and evaluate data files, (c) an Actuarial Pricing System 70 such as AXIS, TAS or PROPHET that access data files and assumptions and generates pricing results, and (d) a Standard Data Specifications & Template such as some hard coded or programmed application that translate one data file format to the suitable data file format. The Input Device 56 such as a keyboard receives Input Data 54 either manually or electronically, depending on the embodiment preferred for a particular application hereof. Output Device 80 and Output Device 82, such as a printer or a CD drive; produce such documents, in generally standardized manner, as the Jurisdictional Financial Analysis Output 84, Consolidated Financial Analysis Output 86, and Other Financial Analysis Output 88. These financial analysis output, including the input data, processed results, statistical and financial assumptions, and other relevant information as well as processing logic, is normally shared via a network of computers as indicated in FIG. 25 (Computer System 52, and computer systems, Blocks 802-820, of parties involved such as First Party, Second Party, Third Party, Tax Advisors, Accounting Advisors, Marketing Advisors, Legal Advisors, Internet Network, Other Consultants and Regulatory Bodies) and technical discussions occur until desired results are processed and illustrated formally in Processed Jurisdictional Model Documents 90, Processed Consolidated Model Documents 92, Processed Other Documents 94.

A computer-readable media can tangibly embody a program of instructions executable by the Computer 58 to perform the step of initiating an initial placement of the parts of a financial product in respective jurisdictions using data standardized for input by at least one computer-generated template and for output by standardized documentation obtained from computer-accessible memory. Similarly, a computer-readable media can tangibly embody a program of instructions executable by the Computer 58 to perform the steps of: separating a financial product into parts in respective jurisdictions; calculating, responsive to input jurisdictional data, respective valuations of the parts; and signaling for placement of the parts including the valuations in the respective jurisdictions. Either case can further include the steps of: loading accounting data for transaction openings and closings of the respective parts; storing historical results for the parts in the respective jurisdictions; and storing consolidated results for the financial product. Any aspect of computer support can be so embodied, and again, the media of can comprise at least one of a RAM, a ROM, a disk, an ASIC, and a PROM.

Likewise, Memory System 60, or other computer-readable media can tangibly hold data (structure) for access by such application program being executed by any or all of the Computer System 52.

Of course depending on the financial product or investment that is at issue, the data requirements will change correspondingly. Thus, representatively, input data can include: one or more financial objectives, in measurable terms; jurisdictional information relevant to the global structure of First Party 2, such information that may help in identifying other parties (related or non-related) in the jurisdictions of interest for the parts; specifications data and pricing data for the financial product, including for example benefit provisions, risks parameters, rates of decrement, financial assumptions, and the like; characteristics of the risks associated with the contractual exposures; and transactions data, for example including legal data on parties' involved, initial placement data, subsequent activities data, and related documentation, as well as reporting requirements, contracts, fees, etc.

Similarly, depending on the financial product or investment that is at issue, the data requirements will change correspondingly. Thus, representatively, processed data can include: jurisdictional accounting and reports, consolidated accounting, reports, other reporting for jurisdictional or party requirements, and comparative, year-to-date and historical versions of the above data.

Viewed as a transmission system, as data stored in memory, or processing relating thereto, at issue is information the user (e.g., in the example of a transmission system, the recipient user) needs to implement, place, manage, or otherwise support (e.g., for placing, etc., the part in the jurisdiction of interest).

FIG. 3 illustrates a flow chart for an embodiment with an illustrative flowchart exemplifying logic of the logic means (e.g., program with controls) for controlling the computer system. Regarding overall operational processes for Computer System 52, note Logic Means 102 can allow for two pathways, one for processing data, using Title Screen Data Processing System 104, and the other for processing model documents, using Word Processing Program 68.

Title Screen Data Processing System 104 can be a coded or programmed for EXCEL application or such application software that allows processing of numbers and logical evaluations. Starting with Main Menu 106 (that allows for the processing of information), the system allows for the creation of new data file (Block 112); update of existing data file (Block 108, retrieval of data file and Block 110, identification of data file); then display (Block 114) and input/edit (Block 116) of data form. The Standard Data Specifications and Template 66 ensures data files are suitable and the Data Management Program 64 ensures efficient data filing. Using Actuarial Pricing system 70, the system allows for the processing (Block 118) of these data files. This pricing system generates multiple scenario results to allow maximization of desired financial objectives and effective use of multi-jurisdictional placement of parts of the financial product. Using Data Management Program 64, data information is printed (Block 120), data form (Block 122) is stored, and data file (Block 72) is stored. Using Word Processing Program 68, model consolidated documents, model jurisdictional documents and other documents are stored as per Blocks 74-78. Data files are maintained per party for the associated part of the financial product and the associated jurisdiction. Data files are also kept historically and per contract, from its effective date. Data storage is physically in the computer or in a computer readable file kept offsite. Jurisdictional requirements (e.g., as used herein, including any jurisdictional considerations) are also taken into considerations. As defined in detail above, data includes financial objectives, jurisdictional information, specifications and pricing data to the financial product, characteristics of risks associated with contractual exposures and detail transactions data.

Word Processing Program 68 allows for creating blank model documents (Blocks 74-78, consolidated documents, jurisdictional documents and other documents), editing existing model documents for any updates (Block 126), printing such results (Block 128) and storing different versions of model documents (Block 130). Model documents showing current results and usually comparative, year-to-date and historical results are also produced regularly. Model documents per regular accounting periods showing consolidated results, jurisdictional results and other relevant results are maintained historically per contract.

The Logic Means 102 allows for continuing processing in Blocks 104, 106 and 132 (thru the title screen, main menu and the logic to continue with the word processing program) as well as for finalization of the process thru Blocks 124 and 132 (through a quit routine in the title screen and the logic to quit with the word processing program).

FIGS. 4-6 collectively illustrate a flow chart for an embodiment representing data input, computational and other logic, and data output of the logic means for controlling the computer system. Input data is received during the early stages of preparation for the transactions until the transactions are placed. The process includes Inputting Financial Objectives of a First Party 202, Inputting Jurisdictional Information 204, Inputting Specifications for a Financial Product 206, and Inputting Pricing Data for a Financial Product 208. An evaluation of the financial objectives, the jurisdictional information, the specifications, and the pricing data for a financial product allows for Separating a Financial Product into Parts for Placing in Respective Jurisdictions 210. The activity separating into parts is an iterative process and is guided by the process Calculating Respective Valuations of Parts in Respective Jurisdictions 212. Next there is Generating Documentation to Carry out the Implementation, Including Initial Placement Documentation and Periodic Documentation 214. Further steps can include (i) Producing an Accounting for a First Party Buying the Financial Product from a Second Party 216 (the development of the financial, using the specifications and pricing data received, was accomplished in earlier steps), and (ii) Producing an Accounting of the First Party Carrying Out the Implementation Using the Parts of the Financial Product in the Respective Jurisdictions, in Respective Financial Transactions with Respective Other Parties to Accomplish Financial Objectives 218.

The computer system maintains a copy in memory of all data used in the transactions; that is, the input data, the financial product and the parts of the financial product, the valuations, the documentation to carry out the implementation and the accounting for all the activities to accomplish the financial objectives by the first party with the second party and all other parties. A copy of the financial results is stored; financial results (a) per other party for respective part of the financial product and per respective jurisdiction, and (b) on a consolidated basis. The financial results are also kept per regular time period, per year-to-date period, per comparative time periods and historically. Storage off-site is also maintained. Blocks 220-226, and 230-236 allow for the storage of information. This stored information includes financial objectives, jurisdictional information, product specifications, pricing data, financial product and separated parts, valuations, documentation, accounting data and other reports.

FIGS. 7-12 collectively illustrate a flowchart of the processes in the data input, computational and other logic, and the data output of the logic means for controlling the computer system, with regard to implementing parts of, or from, a financial product or instrument to accomplish certain financial objectives, such as utilizing capital more effectively, taking advantage of different risk tolerances, improving earnings, facilitating capital movement, funding employee benefits, reducing expenses and taxes, pre-funding capital needs, etc. Accomplishing financial objectives can involve a separation of the parts of the financial product, preferably to place the parts into different national, regulatory, accounting, tax, etc., jurisdictions, to accomplish one or more financial objectives that could not be accomplished as effectively in only one jurisdiction.

This can involve, for example, a holding company (HCx), which, in a specific jurisdiction x, writes life insurance policies on the lives of employees or other persons in which it has an insurable interest. HCx then takes out a loan using the insurance policies as collateral. Interest on a loan used to fund a business operation could be an expense deduction for tax purposes in jurisdiction x. In one embodiment, death proceeds are moved to a subsidiary (ASy) with potential future capital needs in jurisdiction y, where death benefits may be taxed more favorably, meaning taxed less than the tax rate in jurisdiction x.

Of course, this idea can be carried out with other particular jurisdictions, with other financial objectives, and with other financial products in making use of the general idea of utilizing multi-jurisdictional advantages applied to implementing the financial products (e.g., annuities, endowments, disability income, other non-insurance financial products or instruments, etc.) Financial objectives can be for funding or pre-funding future capital needs, reducing expenses and taxes or any other financial objective that could not be accomplished as efficiently without this approach.

More particularly as a representative example, consider a Capital Funding Insurance Program (CFIP). A corporation takes out life insurance on the lives of certain employees, retirees or other persons in which it has an insurable interest. The corporation is the owner, premium payer and beneficiary of the insurance policies. CFIP can be used as a tax-favored funding vehicle for long-term liabilities, or to generate an efficient return for pre-funding future capital needs.

In jurisdiction x, CFIP can be used in a twofold manner. First, jurisdiction x Holding Company (HCx) buys CFIP and contributes the policies or the net amount at risk death benefits to an active subsidiary (ASy) in jurisdiction y, where death benefits are tax-favored, to build long-term capital in the subsidiary at a lower cost, while possibly repatriating on a favorable tax basis. Second, when cash is desired by HCx for its use, the policies can be used as collateral for loans, either bank loans or policy loans, to fund this need. Loan interest on these loans may be tax-deductible by HCx.

One aspect, for example, is to generate cash flow for HCx's pension plan; additional benefits, at least from an accounting standpoint, can occur. This can be carried out, for example, by creating a contract between HCx and the pension plan, which commits HCx to use dividends from ASy, arising from ASy's receipt of death proceeds, as contributions to the pension plan. Alternatively, the dividends could be used to help fund other post retirement benefits.

Viewed broadly now to keep context, the computer support (all aspects, including illustration, valuation, pricing, tailoring, separation, placement and related support, documentation, tracking, tax handling, accounting, etc.) relates to separating an investment (e.g., contract rights, consideration, benefits and other provisions) into parts placed in different jurisdictions to realize advantages thereof. This multi-jurisdictional structure is coordinated to accomplish a financial objective that could not be accomplished as efficiently without this approach. To give a more specific example, the support can include handling inputting data on insurance policies and insureds, analyzing the data to determine or aid in determining the best approach to the multi-jurisdictional use of the parts of the policies and/or rights and/or benefits or responsibilities associated therewith, etc., generating documentation, producing illustrations and reports, contracts, accounting and accounting results, particularly for the parts and in correspondence to the jurisdictions, consolidated data, etc. There can be multi-jurisdictional computer systems or systems that cooperate for access, and human steps facilitating the computer-assisted system so as to span even more jurisdictions. In view of the potential complexity of the transactions, establishing standardization with data standards facilitates efficient cooperation. The data standards can be carried out from data templates and generally standardized documentation (with customization as may be desired for individual transactions).

Indeed, computer support can, as may be desired, reach to related activities, including optimizing product fulfillment, underwriting, optimizing pay outs, communications with all involved parties (including providers, intermediaries, etc.), tracking, billing and transfers (including electronic funds transfers), protected communications by encryption, records management, real time and batch processing utilizing distributed networks and Internet communications, product partitioning and determinations related thereto, as well as packaging benefits and parts thereof, budgeting, claims processing, reporting, and coding to track aspects of this multi-jurisdictional approach, partitioning optimization and analysis, and even business to business referrals for associated products and services.

Return now to the aforesaid FIGS. 7-12 relating to inputting financial objectives of the first party, which can involve Selecting (Block 310) at least One Objective from a Group of Pre-funding Capital (Block 302), Funding Benefit Plan (Block 304), Minimizing Expenses (Block 306) and Maximizing Earnings (Block 308) whilst keeping in mind received jurisdictional information (Block 204). Receiving Specifications for a Financial Product 206 further involves Receiving of Respective Characteristics of Risks Associated with Contractual Exposures 312, Underwriting of Said Contractual Exposures 314, Optimizing Product Design and Pay-outs 316, Formulating Pricing of the Financial Product Based on Associated Risks 318 and finally Defining the Financial Product (Block 320) from amongst the choices of insurance policies, life insurance policies, health insurance policies, annuity policies, corporate-owned life insurance policies and maybe even non-insurance products. A further step to defining the financial product involves Establishing Data Standards (Block 390) for Said Specifications and Defining Data Templates (Block 392) for Respective Characteristics of Risks Associated with Contractual Exposures for Insurance Products. With the financial objectives, the jurisdictional information and the specifications for a financial product, Inputting Pricing Data for a Financial Product 208, completes the data input.

With the completion of data input, the next steps are selection processes specifically pertaining to jurisdictions that provide favorable environment for (i) financial products, and (ii) implementation of placing parts of a financial product into respective jurisdictions. The selections need not necessarily be done in a particular order but some selections are related to others. One, a financial product is selected in Opting (Block 332) on a Financial Product in Selected Jurisdiction where such Product can be Issued with Minimal Regulatory Restriction; the choices being such jurisdiction with minimum regulatory restriction on insurance policies (Block 322), life insurance policies (Block 324), health insurance policies (Block 326), annuity policies (Block 328), or non-insurance product (Block 330). Then, among these jurisdictions, another selection is done for a jurisdiction to minimize (Block 334) regulatory capital requirement for the selected financial product. Two, a selection is made of the jurisdiction (Block 348) where at least a portion of loan interest is treated as an expense deduction. Preliminary to this jurisdiction selection, a selection is made on the usage of part of said financial product, the insurance policy value—as loan collateral (Block 354) or simply the exercise (Block 352) of a policy loan provision. Three, an option is selected on the jurisdiction (Block 360)

with an advantageous tax treatment of at least a portion of contingent benefits; the selections are the jurisdiction (Block 356) where the tax rate is lower than the tax rate of the jurisdiction where loan interest is a deduction; and the jurisdiction (Block 358) where there is tax deferral. The situation also calls for an excess of insurance policy face amounts over policy values. Other options are Blocks 336-340 (choices are no tax, lower tax rate than interest deduction jurisdiction and tax deferral for portions of contingent benefit. Four, a selection of a jurisdiction (Block 344) is made where at least a portion of the policy value build up is tax deferred. The second selection on the usage of part of the financial product is Capitalizing, by a Contribution of at least Respective Portions of Insurance Policies, One of Said Parties Being a Member of a Group of Related Entity and Non-related Entity, in Said One of the Jurisdictions 346. In summary, parts of the financial product used are insurance policy values, and excess of insurance policy face amounts over policy values; used for making loans or capitalization; and in selected jurisdictions where loan interest is an expense deduction; there is minimum regulatory restriction in issuance of policies; there is minimum regulatory capital requirement for a financial product; there is tax deferral of policy value build-up; portions of contingent benefits are tax deferred or taxed at lower rates or not taxed.

Any and all of the selection processes in the above paragraphs can be used to provide input to the Separating a Financial Product into Parts for Placing in Respective Jurisdictions 210. The next steps are Calculating Respective Valuations of Parts of Financial Product in Respective Jurisdictions 212, then Generating Documentation to Carry-out the Implementation 214 and finally Producing an Accounting for a First Party Buying the Financial Product from a Second Party 216 and Producing an Accounting for the First Party Carrying-out the Implementation Using the Parts of the Financial Product in Respective Jurisdictions in Respective Financial Transactions with Respective Other Parties 218.

The succeeding processes allow for Electronically Communicating to Said Parties (Block 364) Encrypted Billing and Transfers, including electronic Transfers and for Electronically Communicating over an Internet Network, thereby allowing for speed and accuracy in Producing Accounting (Block 216-218).

Further to Generating Documentation to Carry-out the Implementation (Block 214), are Generating Historical Records for Said Parts, for Valuations, Balance Sheet Activity and Profit & Loss Statements (Block 368); Generating Standardized Documentation 370; Enabling Customization of Said Standardized Documentation for Individual Transactions 372; Generating Illustrations 374; and Generating Contracts 376. Blocks 368-378 complete the documentation processes.

Further to Calculating (Block 212) Respective Valuations of Parts are three more calculating processes (Block 378-382) and subsequent tracking processes (Blocks 384-388). The Calculating processes are of Valuations of the Parts for Respective Initial Placements (Block 378); of Periodic Respective Valuations for the Parts after the Initial Placements (Block 380); and of Respective Valuations for the Parts upon Occurrence of a Contingent Event (Block 382). The Tracking processes are of Said Respective Valuations after the Initial Placements (Block 384); for Said Parts, Balance Sheet Activity and Profit & Loss Statements; and of Consolidated Balance Sheets and Profit & Loss Statements (Block 388).

All input data and data resulting from the logic processes are stored in the computer with steps indicated in Blocks 220-226, 228, 230-236, 394-396, 398, 400-452. These include input data (Blocks 220-226, 404); selected options on jurisdictions (Blocks 398, 438-452); parts of a financial product (Block 298); documentations (Block 232, 406-414); accounting (Block 234-236, 400-402); valuations (Block 230, 416-426); data templates and standards (Block 394-396); and other intermediate results (Block 428-436).

FIGS. 13-18 collectively illustrates a flow chart representing data input, computational and other logic, and the data output of the logic means for controlling the computer system as applied to loan collateralization with policy contribution to a subsidiary.

In a first embodiment, HCx insures, with whole life insurance, the lives of a group of employees, retirees or other persons in which it has an insurable interest. HCx may pay the premiums and is owner and beneficiary of the policies.

If HCx borrows funds for a legitimate business purpose(s) from an unaffiliated lender, secured by the policy cash values as collateral, HCx can use the collateral on a favorable basis. Some examples of legitimate business purpose are to pay HCx operating costs, pay down other debt obtained for HCx, or make HCx capital investments. HCx then may contribute the policy to ASy, and ASy holds the policy until death. ASy is not liable on the loan; however, the cash values remain as security for the loan. The cash value is recorded as an asset of ASy, producing an immediate capital increase in ASy, and any future increases in cash value are recorded on ASy's accounts. HCx may continue to borrow against any cash value increases. At death, ASy receives the proceeds on a tax-favored basis. The loan to HCx becomes due and is paid by HCx. Should HCx then need funds, and ASy has excess funds, then ASy may dividend all or a portion of the proceeds to HCx.

Return now to the aforesaid FIGS. 13-18 relating to inputting financial objectives of the first party whilst keeping in mind received jurisdictional information (Block 204). In this particular embodiment a selection of financial objective has been made via Selecting (Block 614) Pre-funding Objective from a Group of Pre-funding Capital (Block 302), Funding Benefit Plan (Block 304), Minimizing Expenses (Block 306) and Maximizing Earnings (Block 308). Receiving Specifications for a Financial Product 206 further involves Receiving of Respective Characteristics of Risks Associated with Contractual Exposures 312, Underwriting of Said Contractual Exposures 314, Optimizing Product Design and Pay-outs 316, Formulating Pricing of the Financial Product Based on Associated Risks 318 and note a process of making a selection on the financial product by Defining the Financial Product (Block 602) as Corporate-Owned life Insurance Policies. A further step to defining the financial product involves Establishing Data Standards (Block 390) for Said Specifications and Defining Data Templates (Block 392) for Respective Characteristics of Risks Associated with Contractual Exposures for Insurance Products. With the financial objectives, the jurisdictional information and the specifications for a financial product, Inputting Pricing Data for a Financial Product 208, completes the data input.

With the completion of data input, the next steps are selection processes specifically pertaining to jurisdictions that provide favorable environment for (i) financial products, and (ii) implementation of placing parts of a financial product into respective jurisdictions. The selections need not necessarily be done in a particular order but some selections are related to others. In this embodiment, one, the financial product is selected as life insurance policies in Opting (Block 604) on Life Insurance Policies in Selected Jurisdiction where such Product can be Issued with Minimal Regulatory Restriction;

the choices being such jurisdiction with minimum regulatory restriction on insurance policies (Block 322), life insurance policies (Block 324), health insurance policies (Block 326), annuity policies (Block 328), or non-insurance product (Block 330). Then, among these jurisdictions, another selection is done for a jurisdiction to minimize (Block 334) regulatory capital requirement for the selected financial product. Two, a selection is made of the jurisdiction (Block 348) where at least a portion of loan interest is treated as an expense deduction. Preliminary to this jurisdiction selection, a selection of Opting (Block 610) on Collateralizing Loans with Respective Policy Values is made from the alternatives of, the insurance policy value—as loan collateral (Block 354) or simply the exercise (Block 352) of a policy loan provision. Selection three as follows is dropped as a process in this particular embodiment. An option is selected on the jurisdiction (Block 360) with an advantageous tax treatment of at least a portion of contingent benefits; the selections are the jurisdiction (Block 356) where the tax rate is lower than the tax rate of the jurisdiction where loan interest is a deduction; and the jurisdiction (Block 358) where there is tax deferral. The situation also calls for an excess of insurance policy face amounts over policy values. In this embodiment, a selection on other options for tax treatment of portions of contingent benefit has been made in Block 606, Opting on at least One of said Jurisdictions where at least a Portion of contingent Benefits is not Taxed from amongst Blocks 336-340 (choices are no tax, lower tax rate than interest deduction jurisdiction and tax deferral for portions of contingent benefit. Four, a selection of a jurisdiction (Block 344) is made where at least a portion of the policy value build up is tax deferred. The second selection on the usage of part of the financial product is Capitalizing, by a Contribution of at least Respective Portions of Insurance Policies, One of Said Parties, a Related Entity, in Said One of the Jurisdictions 608, a selection of a related entity being made in this embodiment. In summary, parts of the financial product used are insurance policy values, and excess of insurance policy face amounts over policy values; used for making loans or capitalization; and in selected jurisdictions where loan interest is an expense deduction; there is minimum regulatory restriction in issuance of policies; there is minimum regulatory capital requirement for a financial product; there is tax deferral of policy value build-up; portions of contingent benefits are tax deferred or taxed at lower rates or not taxed. In this embodiment the above selections are made in Block 612.

In FIGS. 13-18, similarly as in FIGS. 7-12, any and all of the selection processes in the above paragraphs can be used to provide input to the Separating a Financial Product into Parts for Placing in Respective Jurisdictions 210. The next steps are Calculating Respective Valuations of Parts of Financial Product in Respective Jurisdictions 212, then Generating Documentation to Carry-out the Implementation 214 and finally Producing an Accounting for a First Party Buying the Financial Product from a Second Party 216 and Producing an Accounting for the First Party Carrying-out the Implementation Using the Parts of the Financial Product in Respective Jurisdictions in Respective Financial Transactions with Respective Other Parties 218.

The succeeding processes allow for Electronically Communicating to Said Parties (Block 364) Encrypted Billing and Transfers, including electronic Transfers and for Electronically Communicating over an Internet Network, thereby allowing for speed and accuracy in Producing Accounting (Block 216-218).

Further to Generating Documentation to Carry-out the Implementation (Block 214), are Generating Historical Records for Said Parts, for Valuations, Balance Sheet Activity and Profit & Loss Statements (Block 368); Generating Standardized Documentation 370; Enabling Customization of Said Standardized Documentation for Individual Transactions 372; Generating Illustrations 374; and Generating Contracts 376. Blocks 368-378 complete the documentation processes.

Further to Calculating (Block 212) Respective Valuations of Parts are three more calculating processes (Block 378-382) and subsequent tracking processes (Blocks 384-388). The Calculating processes are of Valuations of the Parts for Respective Initial Placements (Block 378); of Periodic Respective Valuations for the Parts after the Initial Placements (Block 380); and of Respective Valuations for the Parts upon Occurrence of a Contingent Event (Block 382). The Tracking processes are of Said Respective Valuations after the Initial Placements (Block 384); for Said Parts, Balance Sheet Activity and Profit & Loss Statements; and of Consolidated Balance Sheets and Profit & Loss Statements (Block 388).

All input data and data resulting from the logic processes are stored in the computer with steps indicated in Blocks 220-226, 228, 230-236, 394-396, 398, 400-452. These include input data (Blocks 220-226, 404); selected options on jurisdictions (Blocks 398, 438-452); parts of a financial product (Block 298); documentations (Block 232, 406-414); accounting (Block 234-236, 400-402); valuations (Block 230, 416-426); data templates and standards (Block 394-396); and other intermediate results (Block 428-436). Note that documentation and accountings can be viewed as products produced by the process of the computer.

FIGS. 19-24 collectively illustrate a flowchart representing data input, computational and other logic, and the data output of the logic means for controlling the computer system as applied to exercise of the policy loan provision with capitalization of a subsidiary by the excess of the policy face amount over the policy value.

In this embodiment, HCx insures, with whole life insurance, the lives of a group of employees, and, perhaps, retirees or other person's in which it has an insurable interest. HCx pays the premiums and is the owner of the policies. HCx designates as beneficiaries, itself for a portion of the death benefit, and ASy, which will need long term capital at some point, for the remainder. Again, HCx can use the policy as collateral for loans to pay its operating costs, pay down other debt obtained for local uses, etc. The loan could be a standard policy loan, which is "non-recourse" to HCx and provides that the insurer can apply the policy cash value or its portion of the death proceeds to pay the loan should the loan ever exceed the cash value or when the policy matures. HCx pays the interest on the loans. At death, HCx receives its portion of the proceeds, less the loan balance, as the insurer applies HCx's portion to pay the loan. The subsidiary receives the excess of the face amount over HCx's portion. Should HCx then be in need of funds and ASy has excess funds, then ASy may dividend all or a portion of its proceeds to HCx.

Return now to the aforesaid FIGS. 19-24 relating to inputting financial objectives of the first party whilst keeping in mind received jurisdictional information (Block 204). In this particular embodiment a selection of financial objective has been made via Selecting (Block 614) Pre-funding Objective from a Group of Pre-funding Capital (Block 302), Funding Benefit Plan (Block 304), Minimizing Expenses (Block 306) and Maximizing Earnings (Block 308). Receiving Specifications for a Financial Product 206 further involves Receiving of Respective Characteristics of Risks Associated with Contractual Exposures 312, Underwriting of Said Contractual Exposures 314, Optimizing Product Design and Pay-outs 316, Formulating Pricing of the Financial Product Based on Associated Risks 318 and note a process of making a selection on the financial product by Defining the Financial Product (Block 602) as Corporate-Owned life Insurance Policies. A further step to defining the financial product involves Establishing Data Standards (Block 390) for Said Specifications and Defining Data Templates (Block 392) for Respective Characteristics of Risks Associated with Contractual Exposures for Insurance Products. With the financial objectives, the jurisdictional information and the specifications for a financial product, Inputting Pricing Data for a Financial Product 208, completes the data input.

With the completion of data input, the next steps are selection processes specifically pertaining to jurisdictions that provide favorable environment for (i) financial products, and (ii) implementation of placing parts of a financial product into respective jurisdictions. In this embodiment, one, the financial product is selected as life insurance policies in Opting (Block 604) on Life Insurance Policies in Selected Jurisdiction where such Product can be Issued with Minimal Regulatory Restriction; the choices being such jurisdiction with minimum regulatory restriction on insurance policies (Block 322), life insurance policies (Block 324), health insurance policies (Block 326), annuity policies (Block 328), or non-insurance product (Block 330). Then, among these jurisdictions, another selection is done for a jurisdiction to minimize (Block 334) regulatory capital requirement for the selected financial product. Two, a selection is made of the jurisdiction (Block 348) where at least a portion of loan interest is treated as an expense deduction. Preliminary to this jurisdiction selection, a selection of Opting (Block 702) on Exercising a policy Loan Provision of Said Financial Product from the alternatives of, the insurance policy value—as loan collateral (Block 354) or simply the exercise (Block 352) of a policy loan provision. Selection three as follows is dropped as a process in this particular embodiment. In this embodiment, three, Block 706, Opting on at least one of said Jurisdictions where there Exists Excess of Insurance Policy Face amount over Policy Values and where at least a Portion of Contingent Benefits are Taxed at a Lower Rate than the Tax Rate where Loan Interest in Deductible has been made; the selections are the jurisdiction (Block 356) where the tax rate is lower than the tax rate of the jurisdiction where loan interest is a deduction; and the jurisdiction (Block 358) where there is tax deferral. The situation also looks into an excess of insurance policy face amounts over policy values. Four, a selection of a jurisdiction (Block 344) is made where at least a portion of the policy value build up is tax deferred. Again for this embodiment, a selection has been made on the usage of part of the financial product, that is Capitalizing, by a Contribution of Respective Excess of Policy face Amounts over Policy Values, One of Said Parties, a Related Entity, in Said One of the Jurisdictions 704. In summary, parts of the financial product used are insurance policy values, and excess of insurance policy face amounts over policy values; used for making loans or capitalization; and in selected jurisdictions where loan interest is an expense deduction; there is minimum regulatory restriction in issuance of policies; there is minimum regulatory capital requirement for a financial product; there is tax deferral of policy value build-up; portions of contingent benefits are tax deferred or taxed at lower rates or not taxed. In Block 708, the above selections for this embodiment are chosen.

In FIGS. 19-24, and similarly in FIGS. 7-12, and in FIGS. 13-18, any and all of the selection processes in the above paragraphs can be used to provide input to the Separating a Financial Product into Parts for Placing in Respective Jurisdictions 210. The next steps are Calculating Respective Valuations of Parts of Financial Product in Respective Jurisdictions 212, then Generating Documentation to Carry-out the Implementation 214 and finally Producing an Accounting for a First Party Buying the Financial Product from a Second Party 216 and Producing an Accounting for the First Party Carrying-out the Implementation Using the Parts of the Financial Product in Respective Jurisdictions in Respective Financial Transactions with Respective Other Parties 218.

The succeeding processes allow for Electronically Communicating to Said Parties (Block 364) Encrypted Billing and Transfers, including electronic Transfers and for Electronically Communicating over an Internet Network, thereby allowing for speed and accuracy in Producing Accounting (Block 216-218).

Further to Generating Documentation to Carry-out the Implementation (Block 214), are Generating Historical Records for Said Parts, for Valuations, Balance Sheet Activity and Profit & Loss Statements (Block 368); Generating Standardized Documentation 370; Enabling Customization of Said Standardized Documentation for Individual Transactions 372; Generating Illustrations 374; and Generating Contracts 376. Blocks 368-378 complete the documentation processes.

Further to Calculating (Block 212) Respective Valuations of Parts are three more calculating processes (Block 378-382) and subsequent tracking processes (Blocks 384-388). The Calculating processes are of Valuations of the Parts for Respective Initial Placements (Block 378); of Periodic Respective Valuations for the Parts after the Initial Placements (Block 380); and of Respective Valuations for the Parts upon Occurrence of a Contingent Event (Block 382). The Tracking processes are of Said Respective Valuations after the Initial Placements (Block 384); for Said Parts, Balance Sheet Activity and Profit & Loss Statements; and of Consolidated Balance Sheets and Profit & Loss Statements (Block 388).

All input data and data resulting from the logic processes are stored in the computer with steps indicated in Blocks 220-226, 228, 230-236, 394-396, 398, 400-452. These include input data (Blocks 220-226, 404); selected options on jurisdictions (Blocks 398, 438-452); parts of a financial product (Block 298); documentations (Block 232, 406-414); accounting (Block 234-236, 400-402); valuations (Block 230, 416-426); data templates and standards (Block 394-396); and other intermediate results (Block 428-436).

The multi-jurisdictional system, specifically in the actuarial pricing system, includes a component that provides computer support for producing illustrations of the implementation of alternative optimum combinations of parts of the financial product, the respective jurisdictions where the parts are placed and the respective parties that the First Party 2 transacts with.

These illustrations are based on the multi-jurisdictional use of the parts of the financial products; the terms, specifications, and financial assumptions inherent in the financial products themselves; and the risks characteristics of the contractual exposures of the First Party 2. The illustrations allow all parties to evaluate on a projection basis the wide range of possible results of the implementations.

FIG. 25 illustrates a flow chart representing interrelated computer systems, such as involvement of the invertors' network of computer systems as well as all interested and involved parties, systems 802-820, to enumerate a few by way of example. These parties are first party, second party, third party, tax advisors, accounting advisors, marketing advisors, legal advisors, Internet network, other consultants and regulatory bodies. FIG. 25 illustrates a flowchart representing interrelated computer systems, though of course the implementation of some or all of the elements thereto will reflect the particular application desired. One such implementation can be viewed as a whole system of interrelated program codes that allows the implementation of the multi-jurisdictional approach to parts of a financial product. An implementation can be carried out with one or more of the following program codes that directs input/output of information among parties and processing related thereto, from the initial discussions, to the initial placement and to the periodic processes to account for valuation results that affect the parties involve; guidelines on jurisdictional research; information on related parties or possible non-related parties; pricing the financial product; tailoring the pricing to the first party and specifications pertaining to benefit provisions and other product parameters; program codes that provide instructions on placing the parts in respective jurisdictions for the jurisdiction where the whole product is purchased to the jurisdiction to which each part is placed; program codes that provide instructions on maintaining accounting; reporting and managing the financial product and the placed parts and for the respective jurisdictions and parties; program codes that provides documentation; reporting; communications and not to forget illustrations for the initial marketing of the implementation; and program codes for central processing that includes the following: data processing means; calculating means; generating means; accounting means; receiving means; underwriting means; pricing means; optimizing means; tracking means; implementation means; electronic communicating means; selecting means; selection means; and/or illustration means.

Reference is made to FIGS. 26 and 27. All the program codes can reside in Block 52 or be distributed among other systems, using some or all of the foregoing, allowing for communications to and from computers comprising Block 52, even in multiple jurisdictions. Block 52 can provides in a program code basis the processes and means to implement placing parts of a financial product into multi-jurisdictions, being responsive to financial objectives that are enhanced by respective jurisdictions.

For example, encompassing program codes within the system can be such as blocks 902-918 for Data template means; Data processing means; Calculating means; Accounting means; Generating means; Tracking means; Electronic communications means; Optimizing means; and/or Underwriting means; as may be desired for a given application.

To exemplify how embodiments might be utilized, consider a computer-aided method of inputting into a computer at least some information from the group of financial objectives of a first party, jurisdictional information, specifications for a financial product and pricing data for the financial product; separating the financial product into parts for placing in respective jurisdictions; calculating, with said computer, respective valuations of parts in respective jurisdictions, using said some of the information in identifying an implementation; generating documentation, with said computer, to carry out the implementation, the documentation including initial placement documentation and periodic documentation; producing an accounting, with said computer, of the first party buying the financial product from a second party; and producing an accounting, with said computer, of the first party carrying out the implementation using the parts of the financial product in the respective jurisdictions, in respective financial transactions, with respective other parties, to accomplish financial objectives.

In such an embodiment, the step of receiving financial objectives may include receiving at least one objective from the group including pre-funding capital, funding benefit plan, minimizing expenses, and maximizing earnings.

In any such an embodiment, the step of receiving specifications for a financial product may include receiving respective characteristics of risks associated with contractual exposures; and further including the steps of: using said computer in underwriting said contractual exposures, optimizing product design and pay-outs, and formulating pricing of the financial product based on associated risks; and defining the financial product as a member of a group consisting of insurance policies, life insurance policies, health insurance policies, annuity policies, corporate-owned life insurance policies, and non-insurance products.

In any such an embodiment, there can further include the step of selecting at least one of said jurisdictions to minimize one or more of: regulatory restriction on issuance of insurance policies; to minimize regulatory restriction on issuance of life insurance policies; to minimize regulatory restriction on issuance of health insurance policies; to minimize regulatory capital requirements for the policies; and/or where at least a portion of policy value build up is tax deferred, as may be desired in a given application.

In any such an embodiment, there can further include the steps of: collateralizing loans with respective insurance policy values; and selecting at least one of said jurisdictions where at least a portion of loan interest is an expense deduction.

In any such an embodiment, there can further include the steps of: capitalizing, by a contribution of at least respective portions of insurance policies, one of said other parties; and further including the step of selecting at least one of said jurisdictions where at least a portion of contingent benefits are not taxed.

In any such an embodiment, there can further include the steps of: capitalizing, by a contribution of at least respective portions of insurance policies, one of said other parties; and further include the step of selecting at least one of said jurisdictions where at least a portion of contingent benefits are taxed at a rate lower than the tax rate in the jurisdiction where the loan interest is deductible.

In any such an embodiment, the step of capitalizing may be carried out with the one of said parties being a non-related entity to the first party located in said one of the jurisdictions or with the one of said parties being a related entity to the first party located in said one of the jurisdictions.

In any such an embodiment, the step of separating parts of said financial product may be carried out with an annuity as the financial product; and further include the step of selecting at least one of said jurisdictions to minimize regulatory restriction on issuance of annuity policies.

In any such an embodiment, the step of separating parts of said financial product may be carried out with insurance as the financial product; and further include the step of selecting at least one of said jurisdictions to minimize regulatory restriction on issuance of insurance policies.

In any such an embodiment, the step of separating parts of said financial product may be carried out with a non-insurance product as the financial product; and further include the step of selecting at least one of said jurisdictions to minimize regulatory restriction on issuance of the non-insurance product.

In any such an embodiment, there can further include the steps of: exercising a policy loan provision of said financial product; and selecting at least one of said jurisdictions where at least a portion of loan interest is an expense deduction.

In any such an embodiment, there can further include the steps of capitalizing, by a contribution of at least respective portions of insurance policies, one of said other parties; and selecting at least one of said jurisdictions where there exists excess of insurance policy face amounts over policy values and where at least a portion of contingent benefits are not taxed.

In any such an embodiment, there can further include the steps of: capitalizing, by a contribution of at least respective portions of insurance policies, one of said other parties; selecting at least one of said jurisdictions where at least a portion of loan interest is an expense deduction; and selecting at least one of said jurisdictions where there exists excess of insurance policy face amounts over policy values and where at least a portion of contingent benefits are taxed. at a rate lower than the tax rate in the jurisdiction where the loan interest is deductible.

In any such an embodiment, there can further include the steps of: capitalizing, by a contribution of at least respective portions of insurance policies, one of said other parties; and selecting at least one of said jurisdictions where there exists excess of insurance policy face amounts over policy values and where at least a portion of contingent benefits are tax deferred.

In any such an embodiment, there can further include the steps of: calculating valuations of the parts for respective initial placements; calculating periodic respective valuations for the parts after the initial placements; calculating respective valuations for the parts upon occurrence of a contingent event; tracking said respective valuations after the initial placements; tracking, respectively for said parts, balance sheet activity and profit and loss statements; and tracking consolidated balance sheet activity and consolidated profit and loss statements.

In any such an embodiment, the step of generating documentation may include generating historical records respectively for said parts, for valuations, balance sheet activity, and profit and loss statements, and also includes forming a historical record, respectively, of consolidated balance sheet activity and profit and loss statements.

In any such an embodiment, the step of generating documentation may include the steps of: generating standardized documentation; enabling customization of said standardized documentation for individual transactions; generating illustrations; and generating contracts.

In any such an embodiment, the step of inputting specifications may include: establishing data standards for said specifications; and defining data templates for respective characteristics of risks associated with contractual exposures for insurance products.

In any such an embodiment, there can further include the steps of: electronically communicating to said parties encrypted billing and transfers, including electronic transfers.

In any such an embodiment, the step of electronically communicating may be carried out by electronically communicating over an Internet network.

In any such an embodiment, there can further include the steps of: selecting at least one of said jurisdictions to minimize regulatory capital requirements for the financial product; selecting at least one of said jurisdictions where at least a portion of financial product value build up is tax deferred; selecting at least one of said jurisdictions where at least a portion of loan interest is an expense deduction; selecting at least one of said jurisdictions where there exists excess of financial product benefit amounts over product values and where at least a portion of contingent benefits are not taxed; exercising a policy loan provision of said financial product; and capitalizing, by a contribution of at least respective portions of financial product, one of said other parties.

In any such an embodiment, there can further include the steps of: selecting at least one of said jurisdictions to minimize regulatory capital requirements for the financial product; selecting at least one of said jurisdictions where at least a portion of financial product value build up is tax deferred; selecting at least one of said jurisdictions where at least a portion of loan interest is an expense deduction; selecting at least one of said jurisdictions where there exists excess of financial product benefit amounts over product values and where at least a portion of contingent benefits are taxed at a rate lower than the tax rate in the jurisdiction where the interest is deductible; exercising a policy loan provision of said financial product; and capitalizing, by a contribution of at least respective portions of financial product, one of said other parties.

In any such an embodiment, there can further include the steps of: selecting at least one of said jurisdictions to minimize regulatory capital requirements for the financial product; selecting at least one of said jurisdictions where at least a portion of financial product value build up is tax deferred; selecting at least one of said jurisdictions where at least a portion of loan interest is an expense deduction; selecting at least one of said jurisdictions where there exists excess of financial product benefit amounts over product values and where at least a portion of contingent benefits are not taxed; collateralizing loans with respective financial product values; and capitalizing, by a contribution of at least respective portions of financial product, one of said other parties.

In any such an embodiment, there can further include the steps of: selecting at least one of said jurisdictions to minimize regulatory capital requirements for the financial product; selecting at least one of said jurisdictions where at least a portion of financial product value build up is tax deferred; selecting at least one of said jurisdictions where at least a portion of loan interest is an expense deduction; selecting at least one of said jurisdictions where there exists excess of financial product benefit amounts over product values and where at least a portion of contingent benefits are taxed at a rate lower than the tax rate in the jurisdiction where the interest is deductible; collateralizing loans with respective financial product values; and capitalizing, by a contribution of at least respective portions of financial product, one of said other parties.

Although only a few exemplary embodiments have been described in detail above, those skilled in the art will readily appreciate that many modifications are possible in the exemplary embodiments without materially from the novel teachings and advantages herein. Accordingly, all such modifications are intended to be included within the scope defined by claims. In the claims, means-plus-function claims are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

The invention claimed is:

1. Apparatus comprising:
   a computer system, comprising a computer, adapted to carry out the steps of:
   receiving, into a memory associated with the computer, specifications for a financial product, pricing data for the financial product, and jurisdictional data;

calculating, responsive to the specifications and the data, respective valuations of parts of the financial product in respective jurisdictions in an implementation of the financial product; and generating documentation for initial placement of the parts in the respective jurisdictions for the implementation.

2. The apparatus of claim 1, wherein the steps include:
producing an accounting of a first party buying the financial product from a second party; and
producing an accounting of the first party carrying out the implementation using the parts of the financial product in the respective jurisdictions in respective financial transactions with respective other parties.

3. The apparatus of claim 1, wherein the steps include receiving respective characteristics of risks associated with contractual exposures from corporate-owned life insurance coverage of individuals.

4. The apparatus of claim 3, wherein the steps include:
underwriting said contractual exposures; and formulating pricing of the financial product based on associated risk.

5. The apparatus of claim 3, wherein the steps include:
optimizing product design.

6. The apparatus of claim 1, wherein the steps include receiving into the memory specifications for an annuity as the financial product.

7. The apparatus of claim 1, wherein the steps include receiving into the memory specifications for insurance as the financial product.

8. The apparatus of claim 1, wherein the steps include receiving into the memory specifications for a non-insurance product as the financial product.

9. The apparatus of claim 3, wherein the steps include calculating valuations of the parts for respective initial placements for the implementation.

10. The apparatus of claim 3, wherein the steps include calculating periodic valuations of the parts after initial placements for the implementation.

11. The apparatus of claim 3, wherein the steps include calculating respective valuations for the parts upon occurrence of a contingent event.

12. The apparatus of claim 3, wherein the steps include tracking said respective valuations of the parts after initial placements.

13. The apparatus of claim 3, wherein the steps include tracking said respective said parts, balance sheet activity, and profit and loss statements.

14. The apparatus of claim 3, wherein the steps include tracking consolidated balance sheet activity and consolidated profit and loss statements.

15. The apparatus of claim 1, wherein the steps include generating historical records respectively for said parts.

16. The apparatus of claim 1, wherein the steps include generating historical records for said parts respectively including valuations, balance sheet activity, and profit and loss statements, and historical records including consolidated balance sheet activity and consolidated profit and loss statements.

17. The apparatus of claim 1, further including generating standardized documentation and enabling customization of said standardized documentation for individual transactions.

18. The apparatus of claim 1, wherein the generating includes generating an illustration of the financial product.

19. The apparatus of claim 1, wherein the generating includes generating an illustration of at least one of the parts of the financial product.

20. The apparatus of claim 1, wherein the generating includes generating a contract for the financial product.

21. The apparatus of claim 1, wherein the specifications are provided as input into at least one data template.

22. The apparatus of claim 1, wherein the receiving includes receiving data of respective characteristics of risks associated with contractual exposures for insurance products.

23. The apparatus of claim 1, wherein the steps include electronically communicating to parties to the implementation encrypted billing and transfers, including electronic transfers.

24. The apparatus of claim 23, wherein said electronically communicating comprises communicating over an Internet network.

25. The apparatus of claim 1, wherein the steps include selecting one of said jurisdictions.

26. The apparatus of claim 3, wherein the steps include at least one of:
selecting a jurisdiction where there is minimum regulatory requirement for issuing financial products;
selecting a jurisdiction where there is minimum regulatory capital requirement for said financial product;
selecting a jurisdiction where at least a portion of loan interest is an expense deduction;
selecting a financial product where at least a portion of financial product value build up is tax deferred;
selecting a jurisdiction where at least a portion of contingent benefits are taxed at a rate lower than the tax rate in the jurisdiction where loan interest is deductible; and
implementing exercise of policy loan provisions; and
implementing capitalization, of a related or non-related party, by a contribution of at least respective portions of insurance policies.

27. The apparatus of claim 3, wherein the steps include
selecting a jurisdiction where at least a portion of loan interest is an expense deduction; and
implementing loan collateralizations with respective insurance policy values.

28. The apparatus of claim 3, wherein the steps include:
selecting a jurisdiction where at least a portion of loan interest is an expense deduction; and
implementing exercise of policy loan provisions.

29. The apparatus of claim 3, wherein the steps include:
selecting a jurisdiction where at least a portion of contingent benefits are tax deferred; and
implementing capitalization, by a contribution of at least respective portions of insurance policies.

30. The apparatus of claim 3, wherein the steps include:
selecting a jurisdiction where at least a portion of contingent benefits are not taxed; and
implementing capitalization, of a related or non-related party, by a contribution of at least respective portions of insurance policies.

31. The apparatus of claim 3, wherein the steps include:
selecting a jurisdiction where at least a portion of loan interest is an expense deduction; and
selecting a jurisdiction where at least a portion of contingent benefits are taxed at a rate lower than the tax rate in the jurisdiction where loan interest is deductible; and
implementing capitalization, of a related or non-related party, by a contribution of at least respective portions of insurance policies.

32. The apparatus of claim 3, wherein the steps include:
selecting a jurisdiction where there is minimum regulatory requirement for issuing financial products;
selecting a jurisdiction where there is minimum regulatory capital requirement for said financial product;
selecting a jurisdiction where at least a portion of loan interest is an expense deduction;

selecting a financial product where at least a portion of financial product value build up is tax deferred;

selecting a jurisdiction where at least a portion of contingent benefits are taxed at a rate lower than the tax rate in the jurisdiction where loan interest is deductible; and implementing loan collateralizations with respective insurance policy values; and implementing capitalization, of a related or non-related party, by a contribution of at least respective portions of insurance policies.

33. Article having computer code stored thereon, which when run on a computer causes the computer to perform the steps of:

receiving information into a memory defining specifications for a financial product and pricing data for the financial product;

calculating respective valuations of parts of the financial product in respective jurisdictions in an implementation of the financial product; and generating documentation for initial placement of the parts.

34. Apparatus comprising:

a computer system, comprising a computer, adapted to carry out the steps of:

receiving information into a memory defining specifications for the financial product and pricing data for the financial product, the data processing means further comprising:

calculating, responsive to jurisdictional data, respective valuations of parts of the financial product in respective jurisdictions in an implementation of the financial product; and generating an illustration of the financial product separated into parts placed in respective jurisdictions.

35. Apparatus comprising:

a computer system, comprising a computer, arranged to receive information and locate said information into a memory, the information including investment specifications and pricing data for a financial product, the computer system adapted to carry out the steps of:

receiving the information and converting the information into signals;

calculating, from said signals, respective valuations of parts of investment in respective jurisdictions; and printing documentation, including said valuations, for the implementation of the parts in the respective jurisdictions.

36. The apparatus of claim 35, wherein the steps include optimizing separation of the parts from said investment.

37. Apparatus including:

a computer system, comprising a computer, arranged to receive information into a memory defining instructions for an initial placement of some, but not all of a financial product in a jurisdiction, and to receive calculated values, the computer system adapted to carry out the steps of:

producing, responsive to the received calculated values, documentation for the initial placement of said some but not all of the financial product.

38. A computer-readable media tangibly embodying a program of instructions executable by a computer to perform the step of initiating an initial placement of parts of a financial product in respective jurisdictions using data standardized for input by at least one computer-generated template and by producing standardized documentation from computer-accessible memory.

39. A computer-readable media tangibly embodying a program of instructions executable by a computer to perform the steps of:

separating a financial product into parts in respective jurisdictions;

calculating, responsive to input jurisdictional data, respective valuations of the parts; and signaling for placement of the parts including the valuations in the respective jurisdictions.

40. The media of claim 39, further including the steps of:

loading accounting data for transaction openings and closings of the respective parts;

storing historical results for the parts in the respective jurisdictions; and storing consolidated results of the parts of the financial product.

41. The media of any one of claims 38-40, wherein the media comprises at least one of a RAM, a ROM, a disk, an ASIC, and a PROM.

42. Apparatus including:

a computer system, comprising a computer, arranged to receive information and locate said information into a memory, the information including investment specifications and pricing data for part of an investment, the computer programmed to periodically calculate a price of the part, including a benefit value, using said specifications and pricing data, to produce historical records and to track the part by using the historical records.

43. Apparatus including:

a computer system, comprising a computer, adapted to carry out the steps of:

calculating benefit values attributable to part of a financial product being placed in a jurisdiction different from another part of the financial product;

generating accounting for the part;

generating documentation for the part; and communicating at least one of said benefit values, said accounting, and said documentation over an Internet network addressed to an other computer.

44. Apparatus including:

a computer system, comprising a computer, adapted to carry out the steps of:

calculating benefit values attributable to part of a financial product being placed in a jurisdiction different from another part of the financial product;

generating accounting for the part;

generating documentation for the part; and communicating at least two of said benefit values, said accounting, and said documentation over an Internet network addressed to an other computer.

45. The apparatus of any one of claims 37-38, wherein the steps include initiating an initial placement of the part of the financial product.

46. Apparatus including:

a computer system, comprising a computer, arranged to receive information and locate said information into a memory, the information including instructions for initiating an initial placement of the part, but not all, of the financial product in a jurisdiction, the computer system generating accounting for the part and generating documentation for the part.

47. Apparatus including:

a computer system, comprising a computer, arranged to receive information and locate said information into a memory, the information including instructions for the part, including at least one of benefit values attributable to the part being placed in the jurisdiction and accounting for the part and adapted to generate, responsive to the received information, documentation for the part.

48. Apparatus including:

a computer system, comprising a computer, arranged to receive information and locate said information into a memory, the information including investment specifications and pricing data for the financial product, the computer system including an input device for receiving the information and converting the information into signals wherein the computer system is adapted to compute, from said signals, respective valuations of parts of investment in respective jurisdictions and produce documentation, including said valuations, of the parts in the respective jurisdictions.

49. A method including:

inputting into a computer information comprising financial objectives of a first party, jurisdictional information, specifications for a financial product, and pricing data for the financial product;

separating the financial product into parts for placing in respective jurisdictions;

calculating, with said computer, respective valuations of the parts in the respective jurisdictions, using said some of the information in identifying an implementation;

generating documentation, with said computer, to carry out the implementation, the documentation including initial placement documentation and periodic documentation;

producing an accounting, with said computer, of the first party buying the financial product from a second party; and producing an accounting, with said computer, of the first party carrying out the implementation using the parts of the financial product in the respective jurisdictions, in respective financial transactions, with respective other parties, to accomplish financial objectives.

50. The method of claim 49, wherein the inputting includes receiving the financial objectives, including at least one objective from the group including pre-funding capital, funding benefit plan, minimizing expenses, and maximizing earnings.

51. The method of claim 49, wherein the inputting includes receiving the specifications for the financial product, including respective characteristics of risks associated with contractual exposures; and further including:

using said computer in underwriting said contractual exposures, optimizing design of the financial product design and pay-outs for the financial product, and formulating pricing of the financial product based on associated risks; and defining the financial product as a member of a group including insurance policies, life insurance policies, health insurance policies, annuity policies, corporate-owned life insurance policies, and non-insurance products.

52. The method of claim 51, further including selecting at least one of said jurisdictions to minimize regulatory restriction on issuance of insurance policies.

53. The method of claim 51, further including selecting at least one of said jurisdictions to minimize regulatory restriction on issuance of life insurance policies.

54. The method of claim 51, further including selecting at least one of said jurisdictions to minimize regulatory restriction on issuance of health insurance policies.

55. The method of claim 51, further including selecting at least one of said jurisdictions to minimize regulatory capital requirements for the policies.

56. The method of claim 51, further including selecting at least one of said jurisdictions where at least a portion of policy value build up is tax deferred.

57. The method of claim 51, further including:

collateralizing loans with respective insurance policy values; and selecting at least one of said jurisdictions where at least a portion of loan interest is an expense deduction.

58. The method of claim 51, further including:

capitalizing, by a contribution of at least respective portions of insurance policies, one of said other parties; and further including selecting at least one of said jurisdictions where at least a portion of contingent benefits are not taxed.

59. The method of claim 51, further including:

capitalizing, by a contribution of at least respective portions of insurance policies, one of said other parties; and further including selecting at least one of said jurisdictions where at least a portion of contingent benefits are taxed at a rate lower than the tax rate in the jurisdiction where the loan interest is deductible.

60. The method of claim 58, wherein the capitalizing is carried out with the one of said parties being a non-related entity to the first party located in said one of the jurisdictions.

61. The method of claim 58, wherein the capitalizing is carried out with the one of said parties being a related entity to the first party located in said one of the jurisdictions.

62. The method of claim 59, wherein the separating parts of said financial product is carried out with an annuity as the financial product; and further including selecting at least one of said jurisdictions to minimize regulatory restriction on issuance of annuity policies.

63. The method of claim 49, wherein the separating parts of said financial product is carried out with insurance as the financial product; and further including selecting at least one of said jurisdictions to minimize regulatory restriction on issuance of insurance policies.

64. The method of claim 49, wherein the separating parts of said financial product is carried out with a non-insurance product as the financial product; and further including selecting at least one of said jurisdictions to minimize regulatory restriction on issuance of the non-insurance product.

65. The method of claims 52-53, further including:

exercising a policy loan provision of said financial product; and selecting at least one of said jurisdictions where at least a portion of loan interest is an expense deduction.

66. The method of claim 51, further including capitalizing, by a contribution of at least respective portions of insurance policies, one of said other parties; and selecting at least one of said jurisdictions where there exists excess of insurance policy face amounts over policy values and where at least a portion of contingent benefits are not taxed.

67. The method of claim 51, further including:

capitalizing, by a contribution of at least respective portions of insurance policies, one of said other parties;

selecting at least one of said jurisdictions where at least a portion of loan interest is an expense deduction; and selecting at least one of said jurisdictions where there exists excess of insurance policy face amounts over policy values and where at least a portion of contingent benefits are taxed, at a rate lower than the tax rate in the jurisdiction where the loan interest is deductible.

68. The method of claim 51, further including:
capitalizing, by a contribution of at least respective portions of insurance policies, one of said other parties; and
selecting at least one of said jurisdictions where there exists excess of insurance policy face amounts over policy values and where at least a portion of contingent benefits are tax deferred.

69. The method of claim 51, further including:
calculating valuations of the parts for respective initial placements;
calculating periodic respective valuations for the parts after the initial placements;
calculating respective valuations for the parts upon occurrence of a contingent event;
tracking said respective valuations after the initial placements;
tracking, respectively for said parts, balance sheet activity and profit and loss statements; and
tracking consolidated balance sheet activity and consolidated profit and loss statements.

70. The method of claim 69, wherein the generating documentation includes generating historical records respectively for said parts, for valuations, balance sheet activity, and profit and loss statements, and also includes forming a historical record, respectively, of consolidated balance sheet activity and profit and loss statements.

71. The method of claim 49, wherein the generating documentation includes at least one of:
generating standardized documentation;
enabling customization of said standardized documentation for individual transactions;
generating illustrations; and
generating contracts.

72. The method of claim 49, wherein the inputting specifications includes:
establishing data standards for said specifications; and
defining data templates for respective characteristics of risks associated with contractual exposures for insurance products.

73. The method of claim 51, further including:
electronically communicating to said parties encrypted billing and transfers, including electronic transfers.

74. The method of claim 73, wherein said electronically communicating is carried out by electronically communicating over an internet network.

75. The method of claim 51, further including:
selecting at least one of said jurisdictions to minimize regulatory capital requirements for the financial product;
selecting at least one of said jurisdictions where at least a portion of financial product value build up is tax deferred;
selecting at least one of said jurisdictions where at least a portion of loan interest is an expense deduction;
selecting at least one of said jurisdictions where there exists excess of financial product benefit amounts over product values and where at least a portion of contingent benefits are not taxed;
exercising a policy loan provision of said financial product; and
capitalizing, by a contribution of at least respective portions of financial product, one of said other parties.

76. The method of claim 51, further including:
selecting at least one of said jurisdictions to minimize regulatory capital requirements for the financial product;
selecting at least one of said jurisdictions where at least a portion of financial product value build up is tax deferred;
selecting at least one of said jurisdictions where at least a portion of loan interest is an expense deduction;
selecting at least one of said jurisdictions where there exists excess of financial product benefit amounts over product values and where at least a portion of contingent benefits are taxed at a rate lower than the tax rate in the jurisdiction where the interest is deductible;
exercising a policy loan provision of said financial product; and
capitalizing, by a contribution of at least respective portions of financial product, one of said other parties.

77. The method of claim 51, further including:
selecting at least one of said jurisdictions to minimize regulatory capital requirements for the financial product;
selecting at least one of said jurisdictions where at least a portion of financial product value build up is tax deferred;
selecting at least one of said jurisdictions where at least a portion of loan interest is an expense deduction;
selecting at least one of said jurisdictions where there exists excess of financial product benefit amounts over product values and where at least a portion of contingent benefits are not taxed;
collateralizing loans with respective financial product values; and
capitalizing, by a contribution of at least respective portions of financial product, one of said other parties.

78. The method of claim 51, further including:
selecting at least one of said jurisdictions to minimize regulatory capital requirements for the financial product;
selecting at least one of said jurisdictions where at least a portion of financial product value build up is tax deferred;
selecting at least one of said jurisdictions where at least a portion of loan interest is an expense deduction;
selecting at least one of said jurisdictions where there exists excess of financial product benefit amounts over product values and where at least a portion of contingent benefits are taxed at a rate lower than the tax rate in the jurisdiction where the interest is deductible;
collateralizing loans with respective financial product values; and
capitalizing, by a contribution of at least respective portions of financial product, one of said other parties.

79. Apparatus comprising:
a computer system adapted to carry out the steps of:
receiving information into a memory, the information defining specifications for a financial product and pricing data for the financial product,
calculating respective valuations of parts of the financial product in respective jurisdictions in an implementation of the financial product,
generating documentation for initial placement of the parts for implementation of the parts of the financial product to accomplish financial objectives of parties to a transaction corresponding to a multi-jurisdictional investment, wherein said computer system comprises: computer-readable media tangibly embodying a program of instructions executable by said computer system to carry out said steps.

80. The apparatus of claim 43, wherein the other computer receives the documentation and is comprised of a first party computer, a second party computer, a third party computer, an accounting advisor computer, a marketing advisor computer, a legal advisor computer, a tax advisor computer, a consultant computer, or a regulatory body computer.

81. The apparatus of claim 44, wherein the other computer receives the at least two of said benefit values, said accounting, and said documentation and is comprised of a first party computer, a second party computer, a third party computer, an accounting advisor computer, a marketing advisor computer, a legal advisor computer, a tax advisor computer, a consultant computer, or a regulatory body computer.

82. The apparatus of any one of claims 1, 34, 35, 37, 42, 46, 47, and 48, wherein the computer system comprises a plurality of computers communicating over a network and one of the computers receives financial analysis output corresponding to at least one said part and comprises a first party computer, a second party computer, a third party computer, an accounting advisor computer, a marketing advisor computer, a legal advisor computer, a tax advisor computer, a consultant computer, or a regulatory body computer.

83. The apparatus of any one of claims 1, 34, 35, 37, 42, 46, 47, and 48, wherein the computer system comprises a plurality of computers communicating over a network and one of the computers receives processed model documents corresponding to at least one said part and comprises a first party computer, a second party computer, a third party computer, an accounting advisor computer, a marketing advisor computer, a legal advisor computer, a tax advisor computer, a consultant computer, or a regulatory body computer.

84. The apparatus of claims 1, 34, 35, 37, 42, 46, 47, and 48, wherein the steps include:
calculating respective valuations of parts for alternative combinations of parts of the financial product with the parts located in different jurisdictions; and
identifying one of the combinations which optimizes the value of the financial product with respect to at least one financial objective specified in input to the computer system.

85. The apparatus of claim 84, wherein the computer system comprises a plurality of computers communicating over a network and one of the computers receives financial analysis output corresponding to at least one said part and comprises a first party computer, a second party computer, a third party computer, an accounting advisor computer, a marketing advisor computer, a legal advisor computer, a tax advisor computer, a consultant computer, or a regulatory body computer.

86. The apparatus of claim 84, wherein the computer system comprises a plurality of computers communicating over a network and one of the computers receives processed model documents corresponding to at least one said part and comprises a first party computer, a second party computer, a third party computer, an accounting advisor computer, a marketing advisor computer, a legal advisor computer, a tax advisor computer, a consultant computer, or a regulatory body computer.

* * * * *